US009656806B2

(12) United States Patent
Brazeau et al.

(10) Patent No.: US 9,656,806 B2
(45) Date of Patent: May 23, 2017

(54) MODULAR, MULTI-FUNCTION SMART STORAGE CONTAINERS

(71) Applicant: Amazon Technologies, Inc., Seattle, WA (US)

(72) Inventors: Jeremiah David Brazeau, Hudson, NH (US); Morris Choun Chung, Worcester, MA (US); Eric James Fitting, Methuen, MA (US); Vikas Reddy Enti Ranga Reddy, Cambridge, MA (US); Lisa Michelle Goldman, Marblehead, MA (US); Gavin Cotter, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 14/622,559

(22) Filed: Feb. 13, 2015

(65) Prior Publication Data

US 2016/0236867 A1    Aug. 18, 2016

(51) Int. Cl.
    *G06F 7/00*       (2006.01)
    *B65G 1/137*      (2006.01)
    *B25J 5/00*       (2006.01)
    *G06Q 10/08*      (2012.01)
    *B65G 1/04*       (2006.01)

(52) U.S. Cl.
    CPC ............ *B65G 1/1378* (2013.01); *B25J 5/007* (2013.01); *G06Q 10/087* (2013.01); *B65G 1/0492* (2013.01)

(58) Field of Classification Search
    USPC ....................................................... 700/218
    See application file for complete search history.

(56) References Cited

U.S. PATENT DOCUMENTS

| 4,664,590 A | 5/1987 | Maekawa |
| 2011/0060449 A1* | 3/2011 | Wurman ............ G05B 19/4189 700/218 |

(Continued)

FOREIGN PATENT DOCUMENTS

| JP | 2000263382 | 9/2000 |
| WO | WO2014116947 | 7/2014 |

OTHER PUBLICATIONS

PCT Search Report and Written Opinion mailed May 9, 2016 for PCT application No. PCT/US2016/015739, 10 pages.

*Primary Examiner* — Kyle Logan
(74) *Attorney, Agent, or Firm* — Lee & Hayes, PLLC

(57) ABSTRACT

A system to provide additional functionality to robots in automated warehouse systems is disclosed. The system can include a number of additional components that can be attached to existing components of the warehouse system to improve safety, functionality, and decrease costs. The system can provide modular tools to enable robots to perform additional tasks without having equipment permanently installed on the robots. The bases or shelves for the automated warehouse system can be equipped with robotic arms, lights, cameras, sensors, actuators and other components to enable a robot to utilize a particular tool for a particular job. The robot and the bases or shelving units can also comprise complementary electronic connections to provide power and/or data communications between the robot, the bases or shelving units, and/or a management module.

19 Claims, 14 Drawing Sheets

(56) References Cited

U.S. PATENT DOCUMENTS

2013/0054005 A1\* 2/2013 Stevens ............... G06Q 10/087
  700/216
2015/0153312 A1\* 6/2015 Gonzalez ................ G01D 5/00
  73/23.2

\* cited by examiner

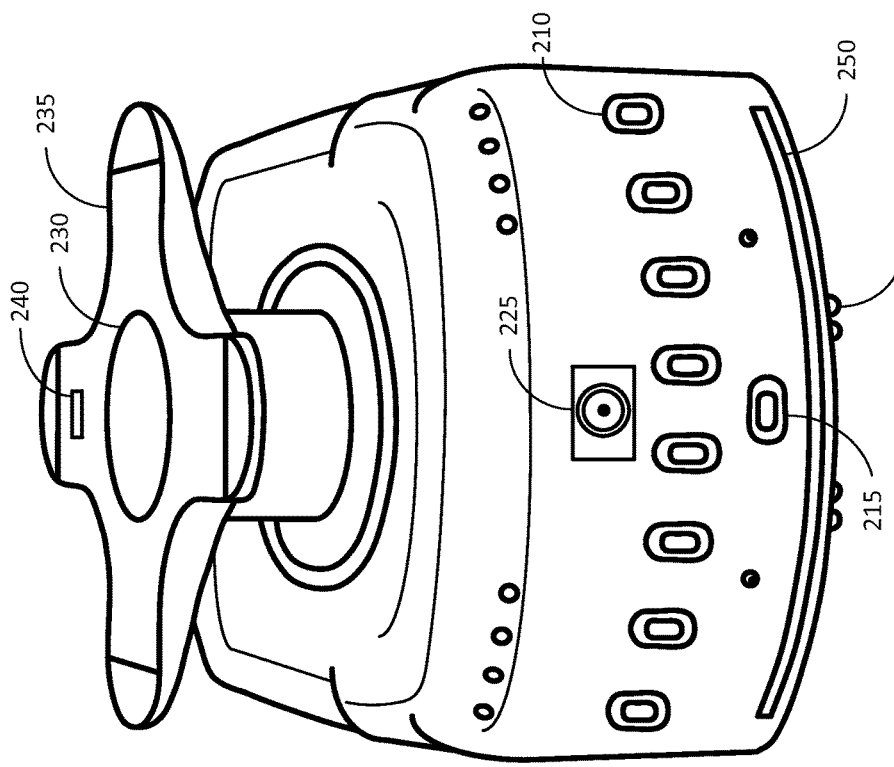
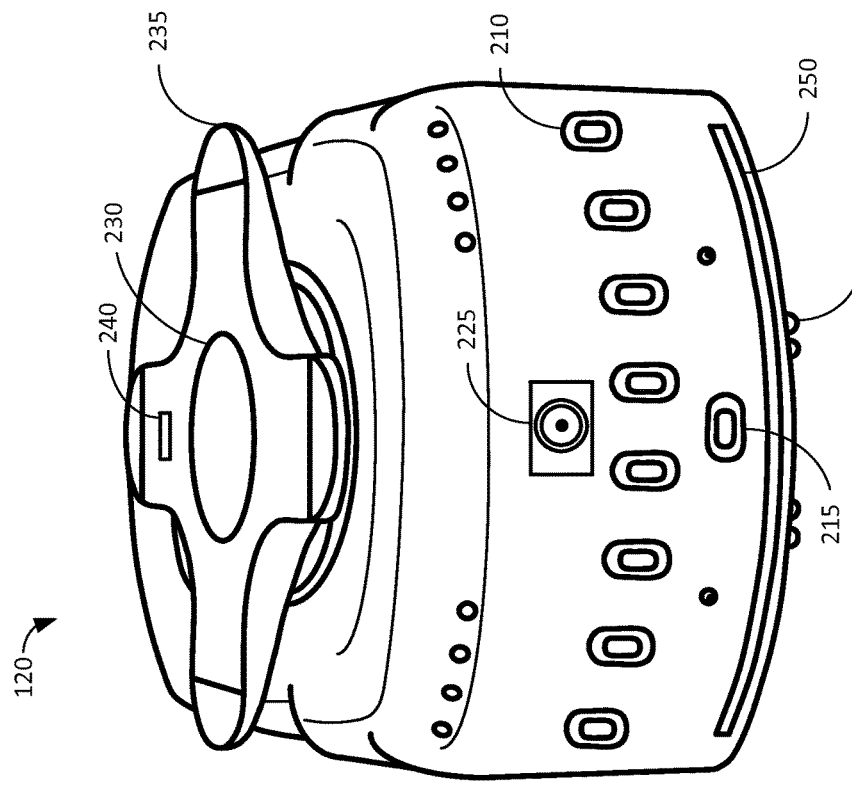
Fig. 2A
Fig. 2B

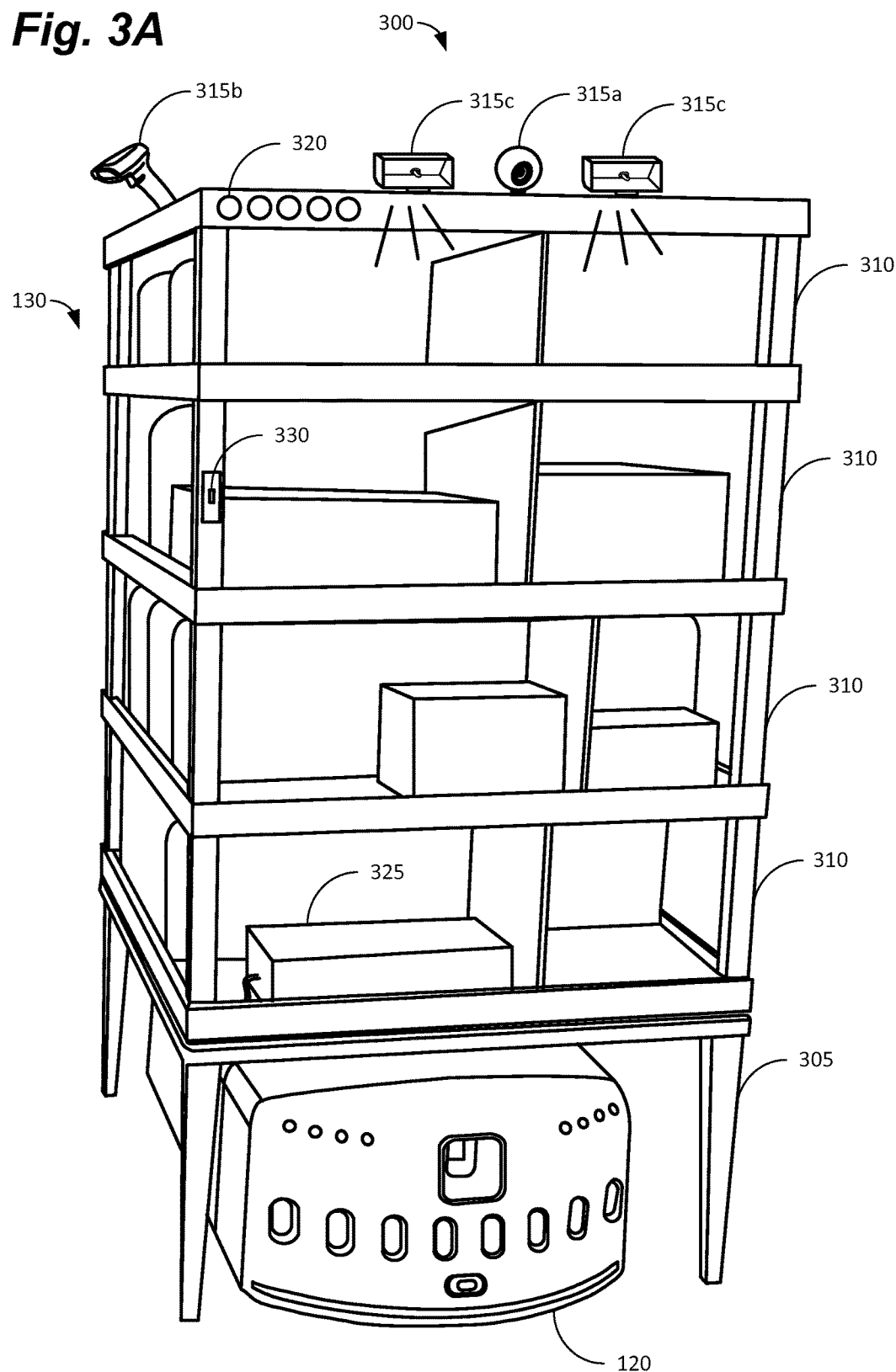

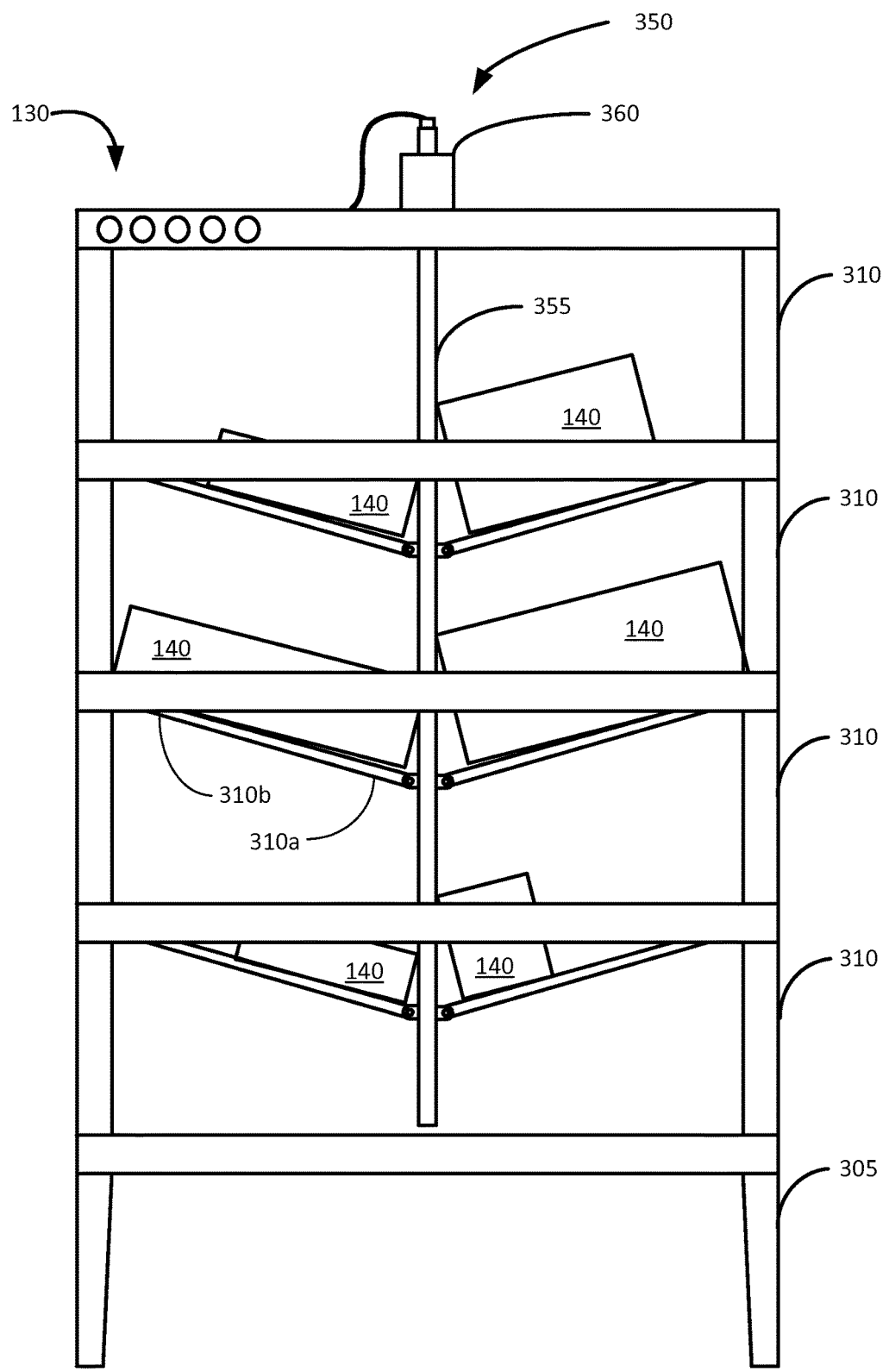

MODULAR, MULTI-FUNCTION SMART STORAGE CONTAINERS

BACKGROUND

Modern inventory systems, such as those in mail order warehouses, supply chain distribution centers, airport luggage systems, and custom-order manufacturing facilities, include a number of complex systems, including robots, automated shelving systems, radio frequency identification (RFID), and automated scheduling and routing equipment. Many systems, for example, comprise robots that travel to shelving systems to retrieve items and return them to a central location for additional processing.

Automated warehouses exist that use robots, for example, to move items or shelves from a storage location in the warehouse to a shipping location (e.g., for inventory items to be boxed and shipped). It is inevitable, however, that some items in the inventory system will be dropped, misplaced, or otherwise mishandled during transfer. In addition, accurate inventories are important to control costs, maintain levels, and meet customer demand, among other things.

BRIEF DESCRIPTION OF THE FIGURES

FIGS. 2A and 2B are isometric views of a robot with a lifting mechanism in the retracted and the extended position, respectively, in accordance with some examples of the present disclosure.

FIG. 3A is an isometric view of a smart pod with additional electronic components installed, in accordance with some examples of the present disclosure.

FIG. 3B is a front view of a smart pod in a first position with additional actuators installed, in accordance with some examples of the present disclosure.

DETAILED DESCRIPTION

Figure 1:
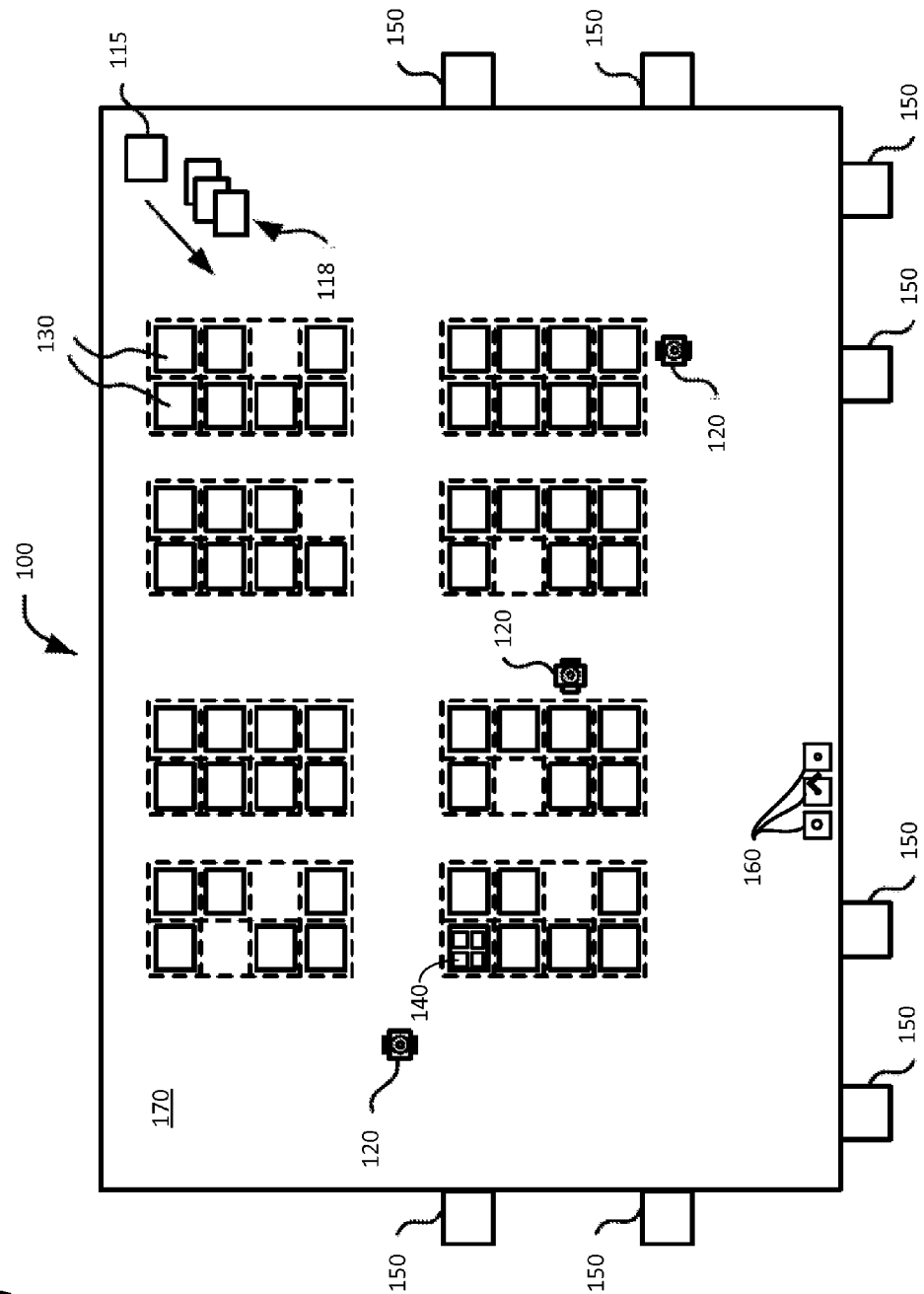
FIG. 1 is a schematic diagram that depicts components of an automated warehouse, in accordance with some examples of the present disclosure.

Examples of the present disclosure relate generally to automated warehouses, and specifically to a modular system for increasing the functionality of robots and shelving components in the warehouse. The shelving components can comprise bases and shelving units. The robots can comprise a plurality of electrical connectors to enable them to connect with complementary connectors on the bases, which may, in turn, connect to the shelving units. In some examples, various electronic components can be installed on the base and/or the shelving unit to provide the base, shelving unit, and/or robot with additional functionality.

In some examples, a robot can retrieve a shelving unit comprising one or more inventory items and delivery it to a work station, for example, for fulfillment of an order or restocking. The robot can then return the shelving unit, pick up a base tool, such as a robotic arm or camera tool, and perform additional operations without permanent modifications to the robot. Additionally or alternatively, the base stations and/or shelving units can include additional equipment that can then be used by the robot (or the system) to perform various tasks including, but not limited to, moving items via one or more robotic arms, sensing environmental conditions or characteristics via one or more sensors, adjusting or moving items associated with the bases and/or shelving units via one or more actuators, lighting areas via one or more lights, and photographing areas via one or more cameras. Due to the modularity of the robots, shelving units, and bases, any robot in the system can connect to and carry any shelving unit and any base tool to utilize components mounted thereon.

To simplify and clarify explanation, the disclosure is described herein by way of systems, apparatuses, and methods for enabling warehouse robots and shelving components to perform additional tasks in a warehouse. One skilled in the art will recognize, however, that the disclosure is not so limited. While, the system may be described as a system to manage warehouses, for example, it should be understood that the system may just as easily be used for robots used on assembly lines, for delivery, and in many other environments. In addition, the system is described herein for use with warehouse robots, but could also be applied to other vehicles using different form factors such as railroad repair vehicles and earth moving equipment, for example.

The apparatuses, methods, and systems described hereinafter as making up the various elements of the present disclosure are intended to be illustrative and not restrictive. Many suitable vehicles, energy sources, navigational aids, and networks that would perform the same or a similar function as the systems described herein are intended to be embraced within the scope of the disclosure. Such other systems, apparatuses, and methods not described herein can include, but are not limited to, vehicles, systems, networks, and technologies that are developed after the time of the development of the disclosure.

FIG. 1 illustrates an inventory control system 100. The inventory control system 100 can comprise a management module 115, one or more mobile drive units, or robots 120, one or more inventory containers, pods, or bins 130, and one or more inventory work stations 150. The robots 120 can transport the bins 130 between points within a warehouse 170 on their own, or in response to commands communicated by the management module 115. Each bin 130 can store one or more types of inventory items 140. As a result, the inventory control system 100 is capable of moving inventory items 140 between locations within a workspace, such as a storage facility or warehouse 170 to facilitate the entry, processing, and/or removal of inventory items 140 from inventory control system 100 and the completion of other tasks involving the inventory items 140.

The management module 115 can assign tasks to the appropriate components of the inventory control system 100 and coordinate operation of the various components in completing the tasks. These tasks may relate both to the movement and processing of inventory items and the management and maintenance of the components of inventory control system 100. The management module 115 may assign portions of the warehouse 170, for example, as parking spaces for the robots 120, the scheduled recharge or replacement of robot 120 batteries, the storage of bins 130 or base tools 405 (discussed below), or any other operations associated with the inventory control system 100 and its various components.

The management module 115 may select components of the inventory control system 100 to perform these tasks and communicate appropriate commands and/or data to selected components to facilitate completion of these operations. Although shown in FIG. 1 as a single, discrete component, the management module 115 may represent multiple components and may represent, or include, portions of the robots 120, bins 130, or other elements of the inventory control system 100. As a result, any or all of the interaction between a particular robot 120 and the management module 115 that is described below may, for example, represent peer-to-peer communication between that robot 120 and one or more other robots 120, or may comprise internal commands based on memory in the robot 120, for example.

As mentioned above, the robots 120 can be used to move bins 130 between locations within the warehouse 170. The robots 120 may represent many types of devices or components appropriate for use in inventory control system 100 based on the characteristics and configuration of bins 130 and/or other elements of inventory control system 100. In a particular embodiment of inventory control system 100, the robots 120 can represent independent, self-powered devices, such as wheeled or tracked robots or robotic carts, for example, configured to freely move about warehouse 170. Examples of such inventory control systems are disclosed in U.S. Patent Publication No. 2012/0143427, published on Jun. 7, 2012, titled "SYSTEM AND METHOD FOR POSITIONING A MOBILE DRIVE UNIT," and U.S. Pat. No. 8,280,547, issued on Oct. 2, 2012, titled "METHOD AND SYSTEM FOR TRANSPORTING INVENTORY ITEMS," the entire disclosures of which are herein incorporated by reference.

In other examples, the robots 120 can comprise track guided robots configured to move bins 130 along tracks, rails, cables, a crane system, or other guidance or support elements traversing the warehouse 170. In this configuration, the robot 120 may receive power, communications, and/or support through a connection to guidance elements such as, for example, a powered rail, slot, or track. Additionally, in some examples of the inventory control system 100, the robot 120 may be configured to utilize alternative conveyance equipment to move within warehouse 170 and/or between separate portions of warehouse 170.

Additionally, the robots 120 may be capable of communicating with the management module 115 to receive tasks, bin 130 assignments, transmit their locations or the locations of other robots 120, or exchange other suitable information to be used by management module 115 or robots 120 during operation. The robots 120 may communicate with management module 115 using, for example, wireless, wired, or other connections. In some examples, the robots 120 may communicate with management module 115 and/or each other using, for example, 802.11 specification wireless transmissions (e.g., b/g/n), Bluetooth, radio frequency (RF), Infrared Data Association (IrDA) standards, or other appropriate wireless communication protocols.

In other examples, such as in an inventory control system 100 using tracks, the tracks or other guidance elements (e.g., slots or rails) along which robot 120 moves may be wired to facilitate communication between robot 120 and other components of inventory control system 100. Furthermore, as noted above, the robot 120 may include components of the management module 115 such as, for example, processors, modules, memory, and transceivers. Thus, for the purposes of this description and the claims that follow, communication between management module 115 and a particular robot 120 may also represent communication between components within a particular robot 120. In general, the robots 120 can be powered, propelled, and controlled in many ways based on the configuration and characteristics of a particular inventory control system 100.

The bins 130 are used to store inventory items and can include additional features as part of the inventory control system 100. In some examples, each of the bins 130 can include multiple dividers to create multiple bays within the storage bin 130. In this configuration, each storage bin 130 can store one or more types of inventory items 140 in each bay (e.g., each bin 130 may store the same inventory item 140 in all bays, or different inventory items 140 in each bay, or have no bays and store just one type of item 140). Additionally, in particular examples, inventory items 140 may also hang from hooks or bars within, or on, the bins 130. In general, the bins 130 may store inventory items 140 in any appropriate manner within the bins 130 and/or on the external surface of bins 130.

The bins 130 can be configured to be carried, rolled, and/or otherwise moved by the robots 120. In some examples, the bins 130 may also provide propulsion to supplement that provided by robot 120 when moving multiple bins 130, for example. Additionally, each bin 130 may include a plurality of sides, and each bin may be accessible through one or more sides of the bins 130. For example, in a particular embodiment, the bins 130 include four sides. In such an embodiment, bins 130 located at a corner of two sides may be accessible through either of those two sides, while each of the other bins is accessible through an opening in one of the four sides and a free-standing bin 130 may be accessible via all four sides. The robot 120 may be configured to rotate bins 130 at appropriate times to present a particular face and the shelves or dividers associated with that face to an operator or other components of inventory control system 100 to facilitate removal, storage, counting, or other operations with respect to inventory 140.

In particular examples, the inventory control system 100 may also include one or more inventory work stations 150. Inventory work stations 150 represent locations designated for the completion of particular tasks involving inventory items. Such tasks may include the removal of inventory items 140, the addition, or restocking, of inventory items, the counting of inventory items 140, the unpacking of inventory items 140 (e.g. from pallet- or case-sized groups to individual inventory items), the consolidation of inventory items 140 between bins 130, and/or the processing or handling of inventory items 140 in any other suitable manner. The work stations 150 may represent both the physical location and also any appropriate equipment for processing or handling inventory items, such as work benches, packing tools and supplies, scanners for monitoring the flow of inventory items in and out of inventory control system 100, communication interfaces for communicating with management module 115, and/or any other suitable components. Inventory work stations 150 may be controlled, entirely or in part, by human operators or may be partially or fully automated.

In operation, the management module 115 selects appropriate components to complete particular tasks and transmits task assignments 118 to the selected components. These tasks may relate to the retrieval, storage, replenishment, and counting of inventory items and/or the management of robot 120, bins 130, inventory work stations 150, and other components of inventory control system 100. Depending on the component and the task to be completed, a particular task assignment 118 may identify locations, components, and/or actions associated with the corresponding task and/or any other appropriate information to be used by the relevant component in completing the assigned task.

In particular examples, the management module 115 generates task assignments 118 based, in part, on inventory requests that management module 115 receives from other components of inventory control system 100 and/or from external components in communication with management module 115. For example, in particular examples, an inventory request may represent a shipping order specifying particular inventory items that have been purchased by a customer and that are to be retrieved from inventory control system 100 for shipment to the customer. The management module 115 may also generate task assignments 118 in response to the occurrence of a particular event (e.g., in response to a robot 120 requesting a space to park), according to a predetermined schedule (e.g., as part of a daily start-up or cleaning routine), or at any appropriate time based on the configuration and characteristics of inventory control system 100.

The management module 115 may also, in particular examples, communicate task assignments 118 to a robot 120 that include one or more destinations for the robot 120. In this vein, the management module 115 may select a robot 120 based on the location or state of the robot 120, an indication that the robot 120 has completed a previously-assigned task, a predetermined schedule, and/or any other suitable consideration. For example, the task assignment may define the location of a bin 130 to be retrieved, an inventory work station 150 to be visited, a storage location where the robot 120 should park until receiving another task, or a location associated with any other task appropriate based on the configuration, characteristics, and/or state of inventory control system 100, as a whole, or individual components of inventory control system 100.

As part of completing these tasks, the robots 120 may dock with various bins 130 within the warehouse 170. The robots 120 may dock with bins 130 by connecting to, lifting, and/or otherwise interacting with bins 130 such that, when docked, the robots 120 are coupled to the bins 130 and can move bins 130 within the warehouse 170. While the description below focuses on particular examples of robots 120 and bins 130 that are configured to dock in a particular manner, alternative examples of robots 120 and bins 130 may be configured to dock in any manner suitable to allow robots 120 to move bins 130 within warehouse 170.

Components of inventory control system 100 may provide information to the management module 115 regarding their current state, the state of other components of inventory control system 100 with which they are interacting, and/or other conditions relevant to the operation of inventory control system 100. This may allow management module 115 to utilize feedback from the relevant components to update algorithm parameters, adjust policies, or otherwise modify its decision-making to respond to changes in operating conditions or the occurrence of particular events. In addition, while management module 115 may be configured to manage various aspects of the operation of the components of inventory control system 100, in particular examples, the components themselves may also be responsible for some decision-making relating to certain aspects of their operation, thereby reducing the processing load on management module 115.

In some examples, the system 100 can also comprise one or more modular tools 160 for use by the robots 120. The tools 160 can comprise, for example, lights, imaging devices (e.g., cameras), robotic arms, sensors, actuators and other tools or combinations of tools mounted on a modular, or universal, base. In this manner, any of the robots 120 can use any of the tools 160 by simply picking them up and coupling with the tool 160 electronically. In this manner, a single robot 120 (or any robot 120) can be used to sweep the floor, then manipulate an object with a robotic arm, then pick up and transport inventory items, for example, simply by utilizing various modular tools.

In some embodiments, the tools 160 can all be parked in designated or known locations in the warehouse 170. This can enable the robots 120 to locate the tools 160 by their locations, similar to how they locate bins 130. In other examples, the tools 160 can include homing signals, markings, visual identifiers, location identifiers, or other means, to enable the robots 120 to locate the tools 160 using, for example, a camera or other sensor.

In some examples, as shown in FIGS. 2A and 2B, the robots 120 can comprise a number of features. The robots 120 can comprise, for example, one or more drive units 205 to move the robot 120 in the warehouse 170. The drive units 205 can comprise, for example, one or more wheels, balls, tracks, or air cushions. As mentioned above, in some examples, the drive units 205 can be sized and shaped to follow a guidance track in the warehouse. The guidance track can comprise, for example, a train track, magnetic stripe, painted stripe, or electronic or visual markers. In this configuration, the drive units 205 can use optical, magnetic, or other sensors to follow the track. In other examples, the drive units 205 can comprise drive wheels, or other means, and include a pin to follow a slot or electrical pathway in the floor of the warehouse 170.

To prevent accidents, detect faults, and provide guidance and navigation, the robots 120 can be equipped with a number of sensors. In some examples, the robots 120 can comprise one or more proximity sensors 210. The proximity sensors 210 can enable the robot 120 to detect other robots 120, obstructions in the robot's path (e.g., merchandise that has fallen on the warehouse 170 floor and workers in the warehouse 170). The robots 120 can also comprise one or more additional sensors, including, but not limited to, an imaging device, camera 225, or laser scanner 215. The camera 225 can comprise, for example, a video camera, infrared or infragreen camera, or ultraviolet (UV) camera. In some examples, the robots 120 can also comprise additional equipment such as, for example, global positioning system (GPS) receivers and wireless local area network (WLAN) or cellular transceivers.

In some examples, the robot 120 can also comprise one or more additional input devices 230. The input devices 230 can comprise, for example, a camera, laser bar code scanner, RFID reader, or other means to read, for example, tags located on the bottom of the bins 130, or provide additional inputs and data regarding the bins, other robots 120, and/or environmental conditions (e.g., temperature sensors, voltage sensors, battery level indicators, etc.). As discussed in more detail below, this can enable the robot 120 to locate the bins 130 that contain the requested product, request maintenance, and identify problems, among other things. In still other embodiments, the robot 120 can also comprise additional movement sensors such as, for example, a bump or proximity sensor 250 to prevent collisions between the robots 120 and other objects.

The robots 120 can also comprise a lifting mechanism 235. The lifting mechanism 235 can comprise, for example, a screw jack, a hydraulic jack, or an electric jack. In the retracted position (FIG. 2A), the robot can move under the base, or bottom shelf of the one of the bins 130. Once under the bin 130, the robot 120 can scan a tag on the bin 130 with the laser bar scanner 230, for example, to ensure it is in the right location. The robot 120 can then activate the lifting mechanism 235, as shown in FIG. 2B, to lift the bin 130 off the floor (e.g., approximately 5 cm). In some examples, the lifting mechanism 235 can also include a latch, slot, magnet, twist-lock, socket, or other means to mechanically engage the bin 130.

As discussed in greater detail below, in some examples, the lifting mechanism 235 can also comprise one or more couplers 240 to provide electrical, optical, or mechanical connections between the robots 120 and the tools 160 to enable the robot 120 to communicate with, power, operate, retain, and or couple to the tools 160. In some examples, the couplers 240 can comprise a latch or electromagnet, for example, to prevent the bin 130, tools 160, or other objects from falling off the robot 120. In other examples, the couplers 240 can comprise electrical, electro-optical, or mechanical connectors to provide power and/or communications between the robots 120 and the tools 160. In other words, the couplers 240 can provide uni- or bi-directional power and/or communications between the robots 120 and the tools 160 to enable, for example, the robot 120 to control and/or power the tool 160 and vice-versa. In this configuration, the robot 120 may control the tool 160, for example, while a power source on the tool 160 charges the robot 120. Of course, other combinations and permutations are possible and are contemplated herein.

As shown in FIG. 3A, the bin 130 can comprise a base 305 and one or more shelving units 310. In some examples, the shelving units 310 can be modular and can be stacked on top of one another to provide adjustable heights. In some examples, the base 305 can include a bar code, RFID tag, or other labeling means to enable the robot 120 to ensure it has located the correct bin 130. In other words, the robot 120 can be provided with a physical location in the warehouse 170 for the bin 130, go to the bin 130, and then verify it has located the correct bin 130 with the label. This can help quickly identify bins 130 that have been returned to the wrong location or products that have been stored in the wrong bin 130, among other things. As shown, the bins 130 can be used to store inventory items 140, which can include many items that are typically warehoused including, for example, food, parts, merchandise, and files.

Examples of the present disclosure can increase the functionality of both the bins 130 and the robots 120 by providing a system 300 for adding additional features to the bins 130. In this manner, the bins 130, or the bases 305, can essentially become modular tools for the robots 120. As a result, the robots 120 can perform a multitude of additional functions without permanent physical alteration of the robots 120 (e.g., permanent installation of additional components). This can enable the robots 120 to have increased functionality without permanently increasing the weight and/or complexity of the robots 120, for example.

In some examples, the shelving units 310 or base 305 can be fitted with one or more cameras, scanners, lights, sensors, actuators or other electronic or electromechanical equipment 315. In some examples, the electronic or electromechanical equipment 315 can comprise one or more imaging devices or cameras 315a that can be turned on when the robot 120 picks up the bin 130, for example, to enable the areas of the warehouse 170 between the bin's 130 original location and the work station 150 to be monitored. This can enable the system 300 to identify merchandise that has fallen onto the floor, for example, or to monitor employee movement on the warehouse 170 floor. In some examples, the cameras 315a can take high resolution pictures of bins 130 in the warehouse 170 as they travel from location to location to enable visual inventory control, including real-time inventory control. In other words, an employee or automated system can review one or more pictures from the cameras 315a to identify and count merchandise on the shelving units 310. In this manner, the system 300 can both increase inventory accuracy and identify mislabeled or misplaced merchandise.

In other examples, the electronic or electromechanical equipment 315 can comprise one or more scanners 315b (e.g., laser scanners). The laser scanners 315b can enable the system 300 to detect, for example, merchandise 140 that is protruding from the bin 130 or merchandise 140 that has fallen onto the floor of the warehouse. In some examples, the laser scanners 315b can automatically detect when a product has been pulled, or "picked," from the bin 130 to update the status of a pick in the system 300.

In still other examples, the electronic or electromechanical equipment 315 can comprise one or more lights 315c. In some examples, the lights 315c can be used to illuminate the area around the bin 130. This can enable the robot 120 to better scan the warehouse, for example, as it travels therethrough. In other examples, the lights 315c can illuminate when receiving a signal from the management module 115 that the bin 130 has been identified for a pick (e.g., the bin 130 contains merchandise 140 that has been ordered from the warehouse).

In still other examples, the bin 130 can also comprise one or more indicators 320. In some examples, the indicators 320 can comprise, for example, light emitting diodes (LEDs), light bulbs, horns, sirens, or tone generators. The indicators 320 can indicate that the bin 130 needs attention from a robot, picker, or maintenance personnel, for example. If the bin 130 has a broken component, for example, is out of one or more inventory items 140, or has been designated for a pick, the indicators 320 can be activated. In some examples, the indicators 320 can comprise multiple lights, for example, and can also provide information related to battery levels, wireless connection strength, or overall weight, among other things (i.e., the more indicators 320 that are lit, the better the battery or connection strength).

In some examples, the bin 130 can also comprise one or more switches 330. The switches 330 can be used to turn the indicators 320 off and on. In some examples, the switches 330 can comprise a pick switch 330, for example, to deactivate the indicators 320 to indicate that a pick has been completed. In other examples, the switches 330 can be activated by personnel to indicate that a bin 130 needs maintenance, for example, or that a bin 130 is out of an inventory item 140.

If a bin 130 is identified for a pick by the management module 115, for example, the management module 115 can send a command to the bin 130 to turn on its indicators 320. The indicators 320 can provide additional confirmation to the robot 120, for example, that it is lifting and moving the correct bin 130. The bin 130 can then be delivered to a work station 150 where a picker can remove the appropriate merchandise 140. When the pick is complete, either the system 300 can automatically detect that the pick is complete using, for example, the laser scanner 315b, or the picker can indicate that the pick is complete by activating the pick switch 330 (and deactivating the indicators 320).

In some examples, the bin 130 can also comprise an onboard power source 325. The power source 325 can comprise, for example, a battery or a capacitor to enable the electronic or electromechanical equipment 315 to be used without power from a robot 120. In some examples, as discussed below, the robot 120 can recharge the power source 325, or vice versa. Thus, the power source 325 can comprise a backup power source for the bin 130 and/or the robot 120. In other examples, the robots 120 can be the sole power source for the bins. In other words, in this configuration, the bins 130 have no power source 325 and only have electrical power when connected to a robot 120.

Of course, while the indicators 320, pick switch 330, power source 325, and other components are shown in a particular arrangement in FIG. 3A, other configurations are possible. In some examples, each shelf 310 of the bin 130, for example, can comprise an indicator 320. In this manner, the indicator 320 can signify both the bin 130 and the shelf 310 on which the merchandise is located to be quickly identified. Similarly, in some configurations, the pick switch 330 could be located on the bottom of the base 305, for example, such that when the robot 120 picks up the bin 130 to return it, the pick switch 330 is automatically activated. As a result, FIG. 3A is merely intended to be illustrative and not limiting.

Figure 3C:
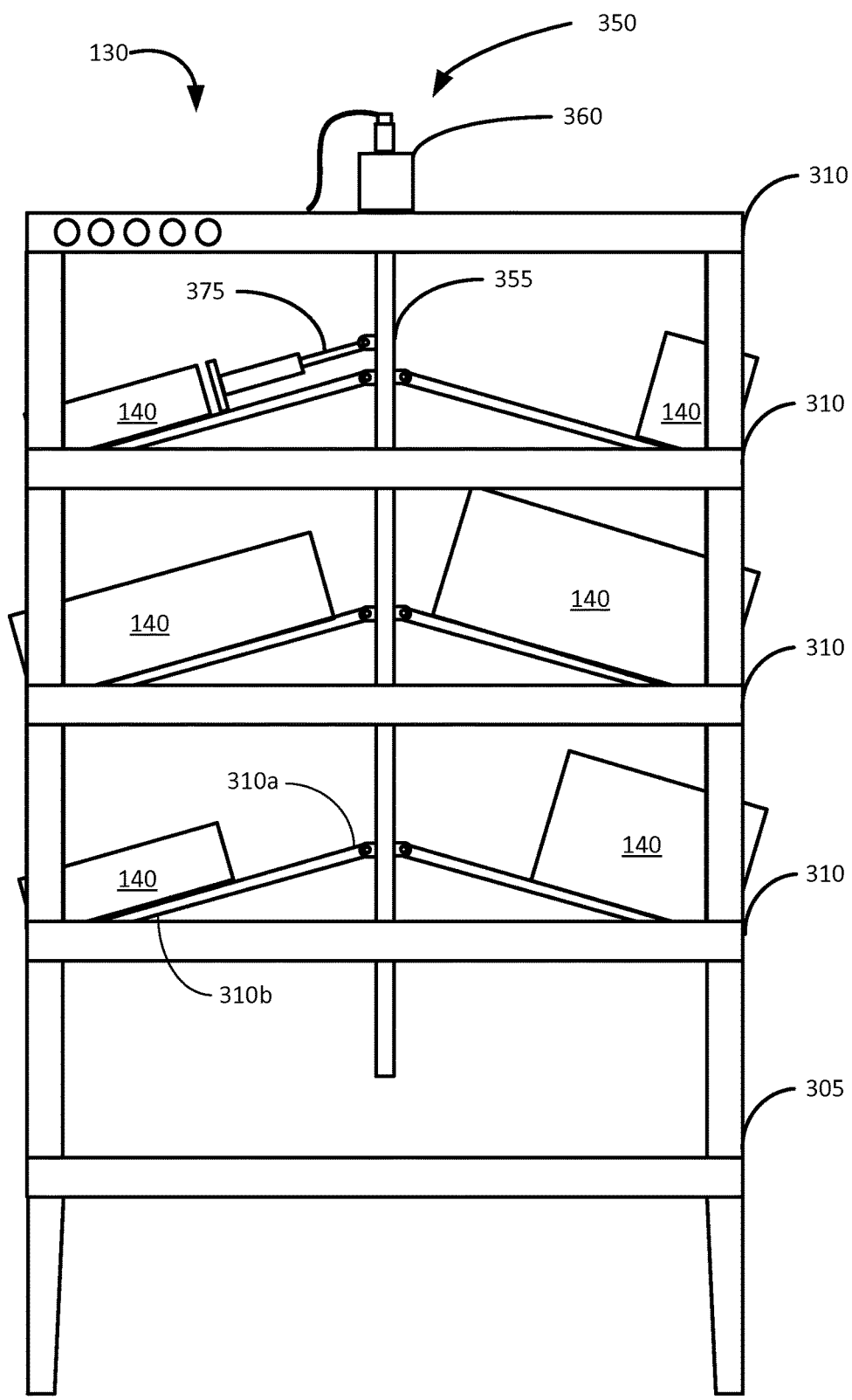
FIG. 3C is a front view of the smart pod of FIG. 3B in a second position with yet more actuators installed, in accordance with some examples of the present disclosure.

As shown in FIGS. 3B and 3C, in some examples, the bin 130 can also comprise one or more actuators. In some examples, the shelves 310 can be pivotally coupled to the bin 130 and can be mounted on a tilting mechanism 350. In this configuration, the tilting mechanism 350 can comprise, for example, a central shaft 355 pivotally coupled to each shelf 310. The central shaft 355 can be moved vertically using an actuator 360 such as, for example, a linear actuator, electric motor, or other means.

In this configuration, the shelves 310 can have a first position (FIG. 3A) and a second position (FIG. 3B). As shown in FIG. 3B, in this first position, the inner portion 310a of the shelves 310 can be tilted down (or the outer portion 310b tilted up, depending on the mechanism) such that the merchandise 140, boxes, totes, and other items slide toward the center of the bin 130. This can prevent merchandise 140 from snagging on passing shelves 310 during transportation, for example, and can prevent items from falling off the shelves 310 due to bumps in the warehouse or minor collisions.

As shown in FIG. 3C, when the bin 130 arrives at a work station 150, on the other hand, the shelves 310 can be tilted into the second position, with the inner portion 310a of the shelves 310 tilted up in the middle (or, the outer portion 310b tilted down, depending on the mechanism) such that the inventory 140 slides to the outside of the bin 130. This can be useful, for example, to enable a picker to retrieve merchandise from the shelves 310, perform inventory counting or checks, and/or restock the shelves 310. The shelves 310 may also be placed in this position during warehouse inventory operations to enable passing robots 120 to more easily scan or capture images of merchandise, for example.

Moving the shelves 310 between the first position and the second position can also assist in straightening, arranging, or securing the merchandise 140 on the shelves 310. In other words, as the merchandise 140, which may be in boxes of varying sizes, slides into the outer 310b or inner 310a portion of the shelf 310, which can comprise a rim or stop, the boxes will tend to align and straighten. In some examples, the shelves 310 can also be tilted at one or more intermediate positions to facilitate any of various operations or interactions with the bin 130. A particular intermediate position, for example, in which the shelves 310 are substantially level may be useful, for example, for long-term storage to minimize stresses on the shelves 310 and bins 130. Alternatively, each shelf 310, or compartment within a shelf, may be controllably tilted independently of any other shelf or compartment via a corresponding tilting mechanism 350.

In still other examples, one or more of the shelves 310, or compartments within the shelves, can also include a pusher 375. The pusher 375 can comprise a linear actuator, for example, to move the merchandise within the shelves 310. This may be helpful, for example, to move very heavy boxes, for which the tilting of the shelf does not overcome the friction between the box and the shelf 310. In other examples, the shelves 310 can remain in the first position (or in the intermediate substantially level position), for example, and the pusher 375 can move forward only the merchandise 140 to be picked. In other words, all of the merchandise 140 on the shelves can be in a retracted position, away from the edges of the shelves 310, while the merchandise 140 to be picked can be in the forward position.

Figure 4:
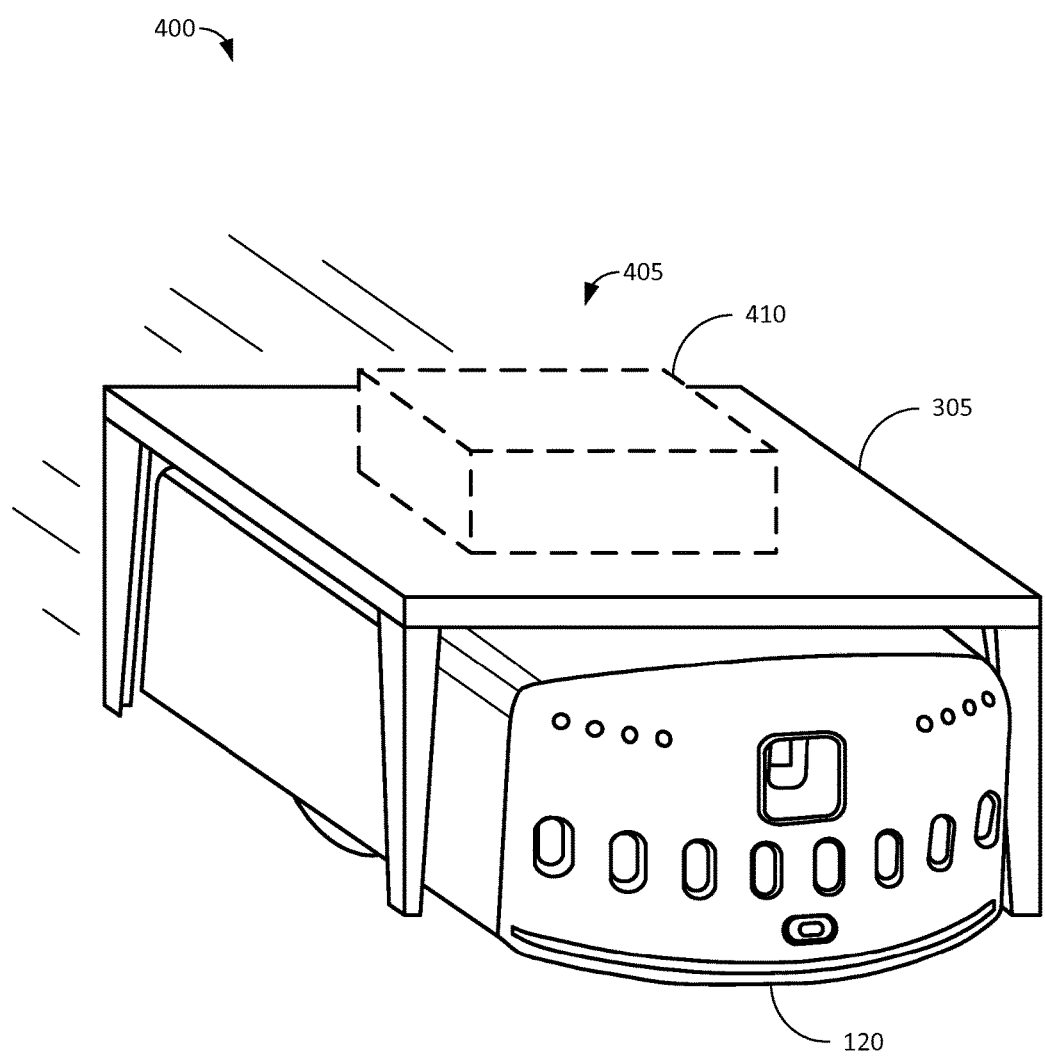
FIG. 4 is an isometric view of a base with a generic base tool installed, in accordance with some examples of the present disclosure.

As shown in FIG. 4, examples of the present disclosure can also comprise a system 400 for providing modular tools for use by any robot 120 in the system 400. In some examples, the system 400 can comprise multiple base tools 405 with one or more components 410 (shown generically in dotted lines) mounted on a base 305. In this manner, rather than having a dedicated robot 120 for each necessary function (e.g., a robot 120 with a robotic arm or a camera array), any robot 120 in the system 400 can act as a transport mechanism for any base tool 405. In some examples, the bases 305 can be the same bases 305 used to support the shelving units 310. In other examples, the bases 305 can be purpose built for the components 410 mounted thereon. This may be necessary, for example, for a component 410 that required additional strength, for example, or needs to fit in tight spaces (e.g., a mopping tool). So, for example, a robotic arm base tool 505, discussed below, may require a structurally rigid base 305 to withstand the torque exerted on the base with the robotic arm 510. A floor base tool 805, on the other hand, may require a special shape to fit between or under bins 130. To this end, some base tools 405 may have special platforms to perform specific tasks, yet maintain the modularity of the interface between the robot 120 and the base tool 405.

In some embodiments, the robot 120 can be in direct control of the base tool 405. In other words, the sensors 210, 215, 250, additional input devices 230, and camera 225 on the robot 120 can be used in conjunction with a processor on the robot 120 to control the base tool 405 to perform various duties. So, for example, the robot 120 can receive a command from the management module 115 to perform a maintenance item, for example. The robot 120 can then retrieve the appropriate base tool 405, proceed to the location in the request, which can be located with one or more sensors 210, 215, 250, additional input devices 230, or the camera 225, for example, and then perform the requested task with the base tool 405. In some examples, the robot 120 can then return the base tool 405 to a predetermined location (e.g., a storage locker) for later use. In other embodiments, the robot 120 can return the base tool 405 to a different location after use and the location for each base tool 405 can be stored by the management module 115 or the robot 120, for example.

In other examples, the robot 120 can use one or more base tools 405 in pre-programmed routines (e.g., to sweep the floor and then mop the floor). In still other embodiments, the robot 120 can simply carry, transport, and/or provide power to the base tool 405, while the management module 115 controls the base tool 405 remotely (e.g., via a transceiver in the base tool 405). In other embodiments, the robot 120 can essentially act as a relay to enable the management module 115 to control the base tool 405 via a communication link in the robot 120. In still other embodiments, the base tool 405 can be autonomous or semi-autonomous and can comprise memory and a processor for performing certain activities. In yet other embodiments, the base tool 405 may require no control (e.g., a sweeper) or power only (e.g., a mopper) and the robot 120 can simply move the base tool 405 in a suitable pattern to achieve the task.

Figure 5:
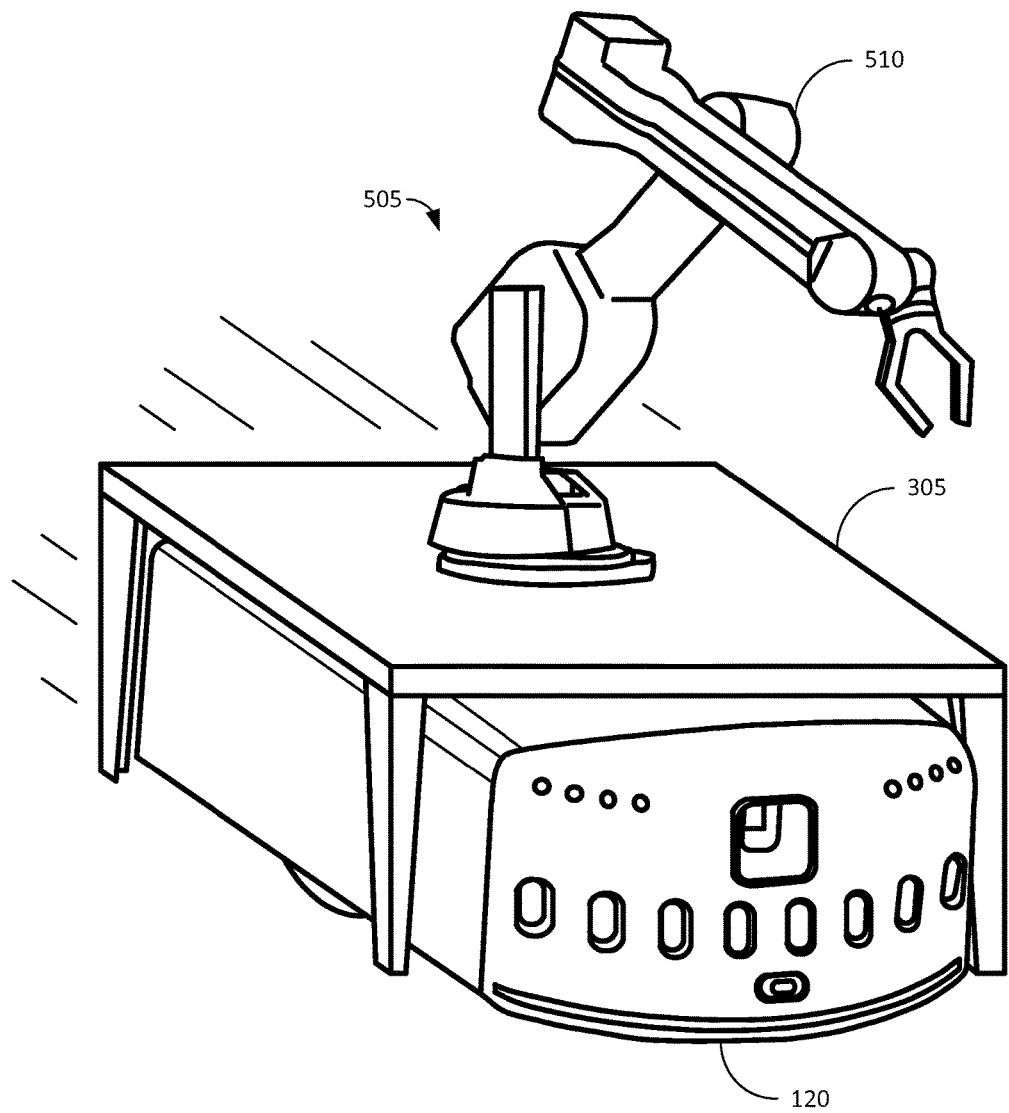
FIG. 5 is an isometric view of a base with a robotic arm base tool, in accordance with some examples of the present disclosure.

In some examples, as shown in FIG. 5, the base tool 405 can comprise a robotic arm base tool 505 comprising a base 305 with a robotic arm 510. If the robot 120 identifies merchandise 140 on the floor of the warehouse 170 with one or more of its sensors (e.g., the camera 225), for example, the robot 120 can send an appropriate message to the management module 115. The management module 115 can then instruct the robot 120 (or another robot 120) to retrieve the robotic arm base tool 505, return to the location, and retrieve the merchandise 140 from the floor. In some examples, the robot 120 can then return the merchandise 140, for example, to an appropriate bin 130, a work station 150, or a dedicated "lost and found" bin 130.

In some embodiments, the robot 120 can be in direct control of the robotic arm 510. In other words, the sensors 210, 215, 250, additional input devices 230, and camera 225 on the robot 120 can be used in conjunction with a processor on the robot 120 to control the robotic arm base tool 505 to perform various duties. So, for example, the robot 120 can return to the location of the aforementioned merchandise 140 on the floor, locate it with one or more sensors 210, 215, 250, additional input devices 230, or the camera 225, and then pick up the merchandise 140 with the robotic arm 510. In some examples, the robot 120 can return the merchandise 140, for example, to the proper bin 130, a work station 150, or a central lost and found area or location.

In other examples, the robot 120 can use the robotic arm base tool 505 in pre-programmed routines (e.g., to sweep the floor). In still other embodiments, the robot 120 can carry the robotic arm base tool 505 and/or provide power, while the management module 115 controls the robotic arm base tool 505 (e.g., via a transceiver in the robotic arm base tool 505) or via a communication link in the robot 120. In still other embodiments, the robotic arm base tool 505 can be autonomous or semi-autonomous and can comprise memory and a processor for performing certain activities.

Figure 6:
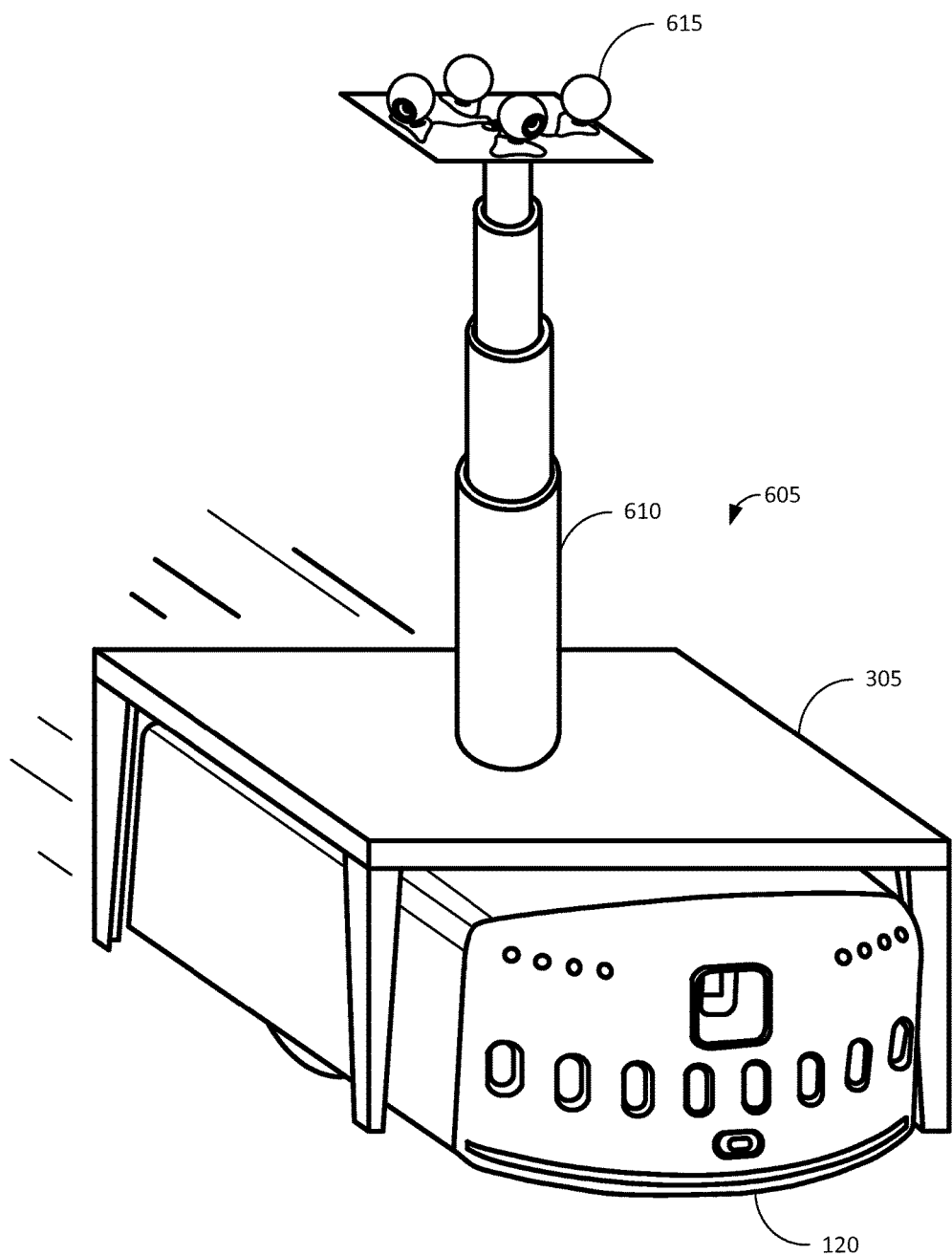
FIG. 6 is an isometric view of a base with a camera base tool comprising a plurality of cameras installed, in accordance with some examples of the present disclosure.

As shown in FIG. 6, in other examples, the base tool 405 can comprise a camera base tool 605 comprising fixed or adjustable (e.g., telescoping or scissor-type) mount 610 with one or more imaging devices or cameras 615. In some examples, as mentioned above the camera base tool 605 can be used to conduct inventory checks and/or counting in the warehouse 170. This can include checking the location and configuration of the bins 130 themselves and checking and/or counting the merchandise 140 in the bins 130. In other examples, the camera base tool 605 can be used periodically to "patrol" the warehouse 170 to, for example, detect intruders, locate lost merchandise, and monitor operations.

In some examples, the camera base tool 605 can comprise one or more RFID scanners 615. As the robot 120 moves around the warehouse 170, therefore, the robot 120 can scan merchandise proximate the robot 120. Because RFID can be designed to have a relatively limited range (e.g. less than 10 feet), the RFID tags can be used to provide accurate inventory data, and can also provide data about the location of inventory. In other words, because the merchandise 140 must be within the range of the RFID scanner 615 to be read, its position is known at least with the range of the RFID system (e.g., 10 feet). As a result, the scanner 615 can read tags on shelves on the robot 120 and any tags on other shelves within 10 feet.

When the robot 120 is moving, however, the RFID tags for the merchandise 140 being carried by the robot 120 will stay in range, while tags located on other shelves will come in and out of range. As a result, the robot 120 (or management module 115) can determine what merchandise the robot 120 is carrying because it remains in range as the robot 120 moves. In addition, the management module 115 can also use speed and direction information from the robot 120 to further confirm the location of merchandise 140 as the robot 120 moves through the warehouse. In other words, the merchandise 140 may be located approximately between the position where it first came into range of the scanner 615 and the position where it went out of range of the scanner 615.

In other examples, the camera base tool 605 can also comprise infrared cameras 615, for example, to identify abnormal heat sources. This can help identify unwanted chemical reactions between adjacent products, for example, spontaneous combustion, and electrical problems, among other things. Of course, the cameras 615 can comprise many types of visible and invisible spectrum detectors, sensors, lasers, and other components.

Figure 7:
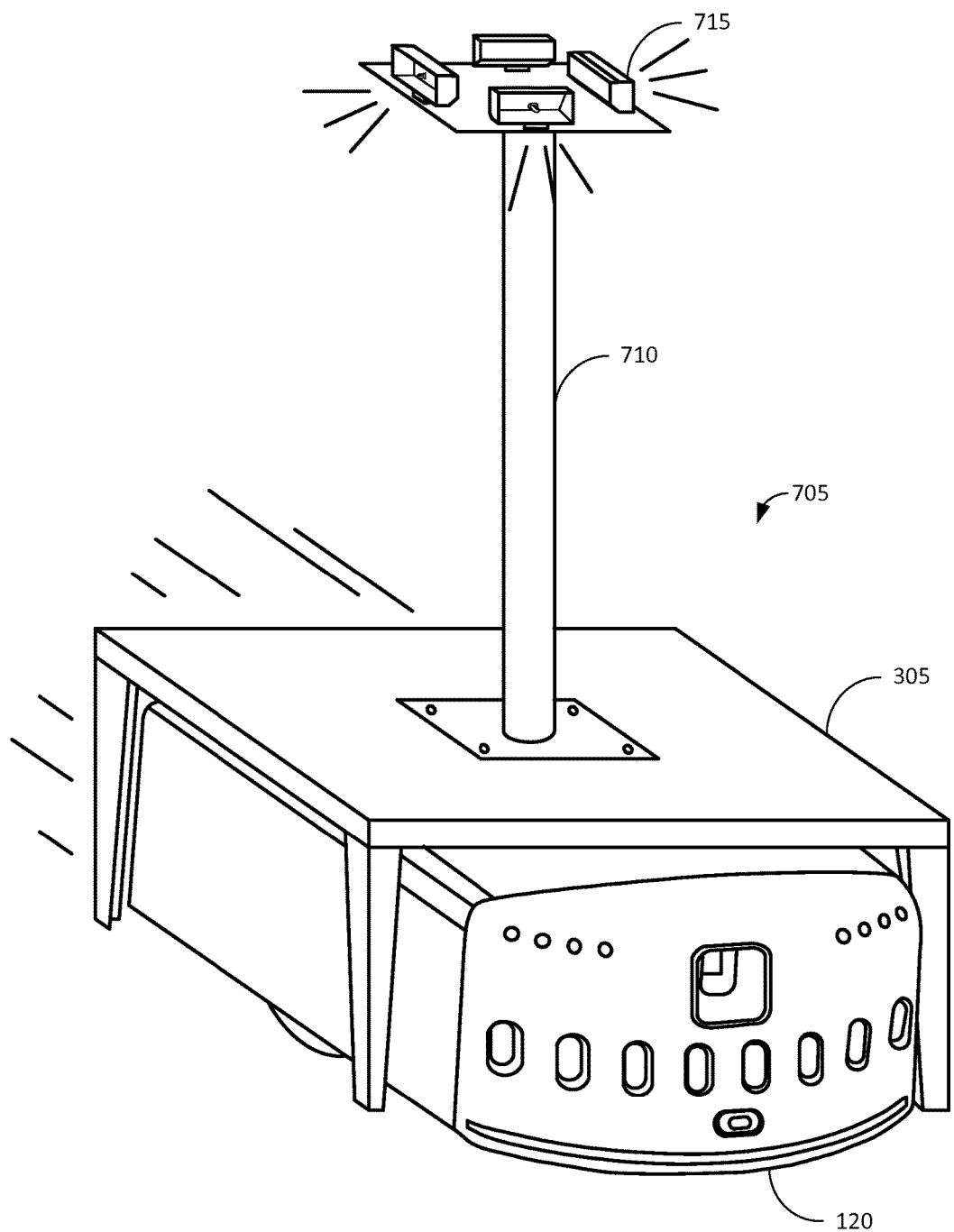
FIG. 7 is an isometric view of a base with a light base tool comprising a plurality of light sources installed, in accordance with some examples of the present disclosure.

As shown in FIG. 7, in still other examples, the base tool 405 can comprise a light tool 705 comprising one or more lights 715, or flashes. The lights 715 can enable the robot 120 to provide emergency lighting, for example, in case of a power failure. The light tool 705 can also provide illumination for repairs in the warehouse 170, for inventory image capture, or as a guide for an employee to a particular bin 130 (e.g., one that is broken). In some examples, the lights 715 can be supported by a fixed or adjustable (e.g., telescoping) base 710.

Figure 8:
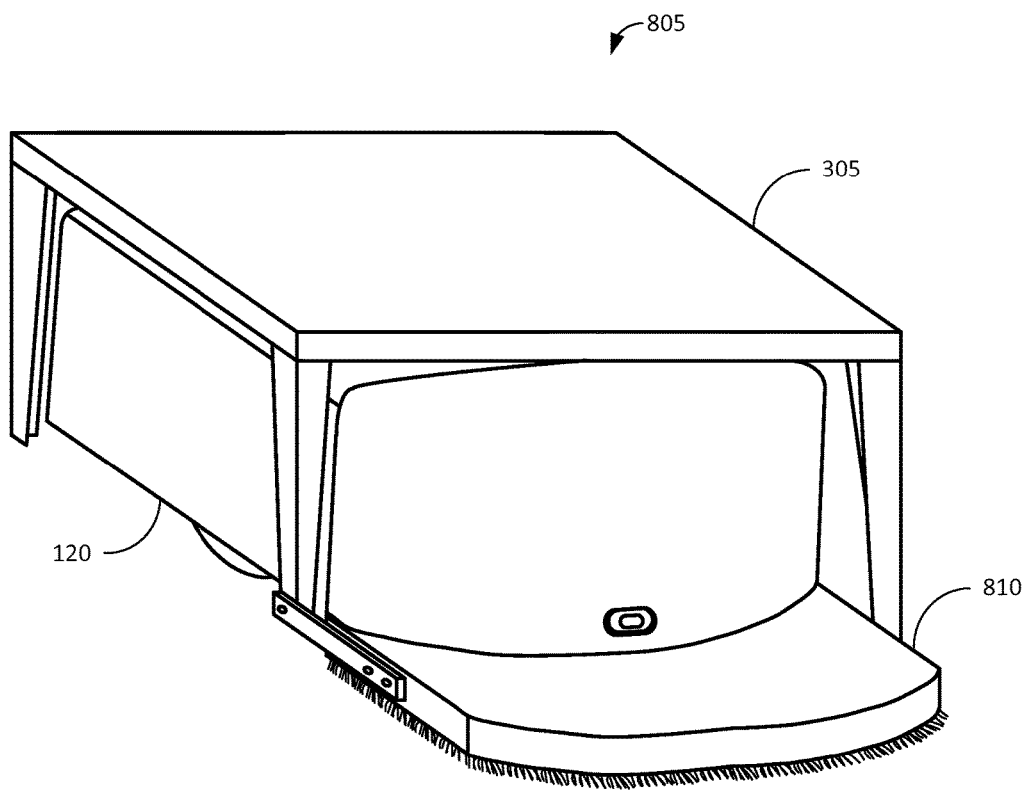
FIG. 8 is an isometric view of a base with a floor base tool comprising one or more floor cleaning tools, in accordance with some examples of the present disclosure.

As shown in FIG. 8, in some embodiments, the base tool 405 can also comprise a floor base tool 805. As the name implies, the floor base tool 805 can comprise tools for cleaning, painting, or otherwise maintaining the floors in the warehouse 170. To this end, in some examples, the floor base tool 805 can comprise a floor cleaning attachment 810. The floor cleaning attachment 810 can comprise, for example, a broom attachment, a mop attachment, a buffer, a vacuum, or a waxer. As discussed below, the floor base tool 805 can enable the robots 120 to clean the warehouse floor without requiring a dedicated floor machine (e.g., an automated floor scrubber).

In other examples, the floor base tool 805 can comprise a tool for painting, striping, stickering, patching, or otherwise maintaining the floors in the warehouse 170 to allow the robots 120 to identify their locations while moving within the warehouse 170. In some examples, the warehouse 170 floor can include magnetic or high visibility stripes, for example, painted or adhered to the floor for use by the robots 120 for guidance. In addition, markings can be provided to create exclusion zones to enable workers to walk through the warehouse 170 without interfering with, or being hit by, robots 120. In this configuration, the floor base tool 805 can be used to install and/or maintain the necessary markings to reduce maintenance costs and time.

Regardless of the base tool 405, in some examples, the base tools 405 can be controlled by the robot 120. The robotic arm base tool 505, for example, can essentially provide the robot 120 with an arm for its use and can be controlled by the robot's 120 processor, in conjunction with the robot's sensors, scanners, and other input devices 210, 215, 230, 250 and/or camera 225. In this manner, the robot 120 can include the functionality of a robot 120 with an arm, but without permanently installing a robotic arm 510 on the robot 120. As a result, each of the robots 120 can be used for multiple purposes, without specializing (e.g., a robot 120 with a permanently installed arm may not be able to pick up bins 130).

In other embodiments, the robot 120 can simply act as transportation, communication conduit, and/or power for the base tools 405 and the base tools 405 can be controlled directly (or via the robot 120) by the management module 115. So, for example, the management module 115 can command a robot 120 to retrieve the floor base tool 805 and then can provide turn-by-turn directions to the robot 120 to sweep or mop the warehouse 170, or a portion of the warehouse 170. In still other embodiments, processing can be shared between the management module 115 and the robot 120. In this configuration, the management module 115 can command the robot 120 to (1) retrieve the floor base tool 805 and (2) sweep or mop the warehouse 170. The robot 120 can then travel through the warehouse 170 using a preset pattern or a random pattern to cover the entire floor. In this manner, some of the management is controlled by the management module 115 (e.g., the timing and location of the cleaning), while the remainder of the management is controlled by the robot 120 (e.g., the pattern to follow, speed, etc.)

Similarly, any robot 120 can use the camera base tool 605 for its own purposes (e.g., to provide a higher vantage point than the camera 225 on the robot 120) or can be used to capture images of all or part of the warehouse 170 using the camera base tool 605. As mentioned above, this can be used to conduct inventory checks and/or counting, for example, or for security or patrol purposes. As before, in some embodiments, the robot 120 can essentially act as a "dumb terminal," and can act based solely on commands from the management module 115. In this configuration, the management module 115 can command the robot 120 to go to the location of the camera base tool 605, pick it up, and then traverse the warehouse 170 in a pattern or route provided by the management module 115. In other examples, the robot 120 can be autonomous or semi-autonomous and the management module 115 can simply send a command to the robot 120 to "conduct inventory check." The robot 120 can then go to a preset location (or look for) the camera base tool 605, pick up the camera base tool 605, and the follow a preset or random pattern designed to cover the entire warehouse 170, or a portion of the warehouse 170. In still other embodiments, control and command can be shared by the robot 120 and the management module 115 with the management module 115 specifying a location to conduct inventory checks (e.g., the northwest quadrant of the warehouse 170) and the robot 120 determining the pattern required for same.

Figure 9A:
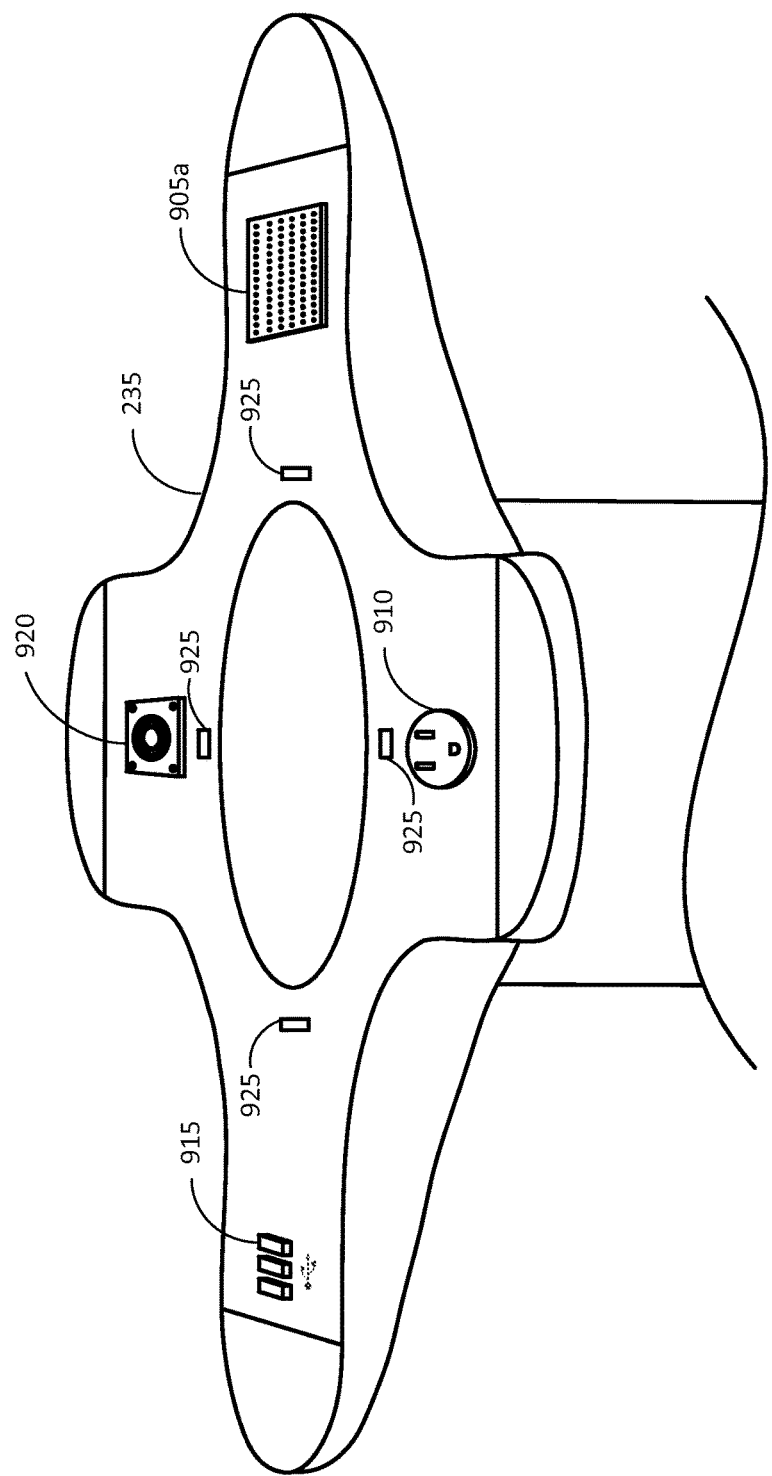
FIG. 9A is an isometric view of a robot lifting mechanism comprising a plurality of electrical connectors and load cells, in accordance with some examples of the present disclosure.
Figure 9B:
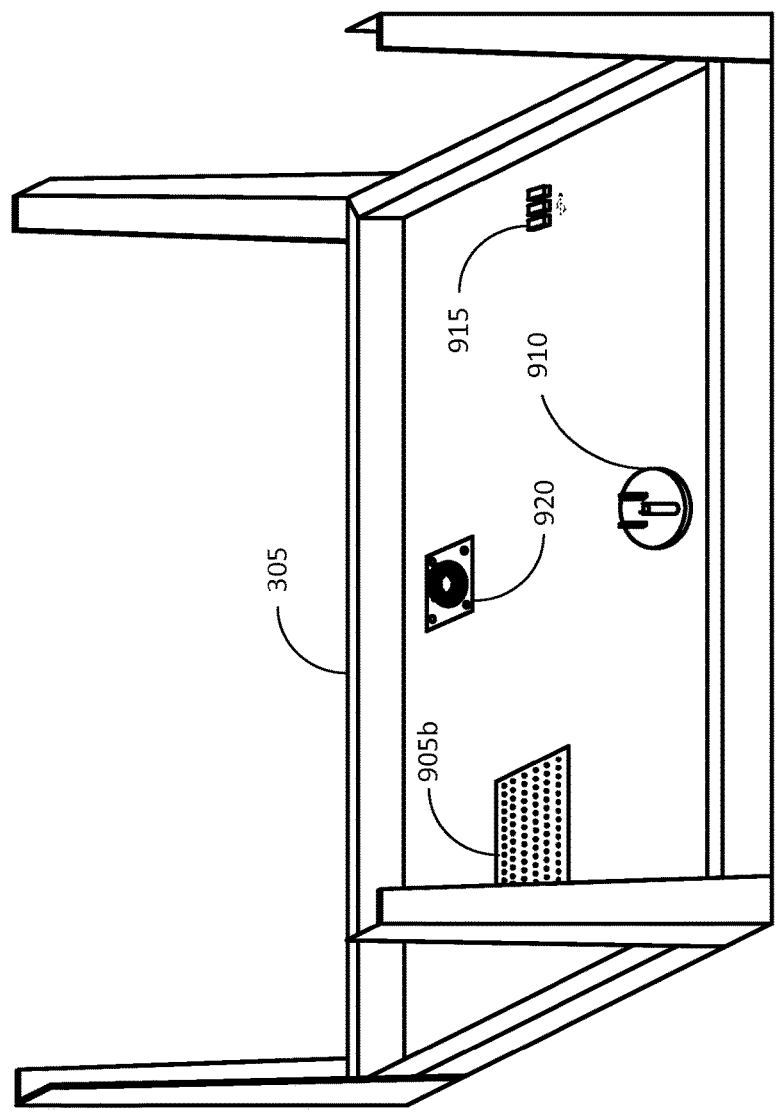
FIG. 9B is an isometric view of a base with a plurality of electrical connectors, in accordance with some examples of the present disclosure.

As shown in FIGS. 9A and 9B, in some examples, the base tools 405 can be powered by power sources located on the base 305. The base 305 can include, for example, one or more batteries, capacitors, fuel cells, or other power sources to power one or more base tools 405. In other examples, the base tools 405 can be powered by the power source on the robot 120. To this end, as shown in FIGS. 9A and 9B, the lifting mechanism 235 and the base 305 can comprise complementary power and/or data communications connections. In some examples, the lifting mechanism 235 can comprise one portion (e.g., male or female) of the connection(s) (FIG. 9A), while the other portion of the connections can be located on the base (FIG. 9B). The connections can comprise, for example, a ball and grid array 905, a three-pronged power socket 910, one or more USB connectors 915, or a round, multi-pin connector 920. Of course, other types of data communications connections are possible including, but not limited to, isolated optical/fiber optic communications connections, short range RF (e.g., Bluetooth®), near field communications, automotive style connectors, and spring loaded connectors (e.g., "pogo" connectors). Similarly, other types of power connections are possible including, for example, inductive power transfer, contact plates, and other contact and non-contact power transfer connections.

In some examples, data communications and/or power transfer can be provided by a ball and grid array 905. As shown in FIGS. 9A and 9B, the ball grid array 905 can comprise a plurality of balls 905a on the lifting mechanism 235 and a plurality of hemispherical sockets 905b on the base 305 (or vice-versa). In this manner, because the balls 905a tend to self-align in the sockets 905b, less accuracy is required to make the connection. In addition, because of the high number of connections possible, in some examples, partial misalignment of the ball grid array 905 may be permissible, with the robot 120 identifying and mapping the correct power and communications pathways. In other words, if there are substantially more connections than are required, only partial alignment is necessary and the robot 120 can identify each connection and properly connect them.

In some examples, the connection between the base 305 and the robot 120 (regardless of the connector) can include one or more low power connections (e.g., 5V DC for electronics) and one or more high power connections (e.g., 24V DC or 110V AC). The connection can also include one or more data communications connections between the base 305 and the robot 120. In some examples, the data communications connections can comprise cable area network (CAN), LAN, and other wired connections. In other examples, the data communications connections can comprise near field wireless connections, WLAN, or other wireless connections. In still other examples, all data communications connections can be wireless (e.g., WLAN) and all power connections can be wireless (e.g., inductive power transfer).

The power and data communications connections (e.g., the ball grid array 905) between the robot 120 (via the lifting mechanism 235) and the base tools 405 and bins 130 can enable the robot 120 to provide power to the base tools 405 and bins 130, and vice-versa. In some examples, these connections can also enable the robot 120 to control the base tools 405. In other words, the robotic arm base tool 505 can essentially become the "robot's 120 arm" when engaged (e.g., lifted) by the robot 120. In this manner, any of the robots 120 can add the robotic arm base tool 505 when needed for improved functionality, and remove it when not needed to reduce weight and complexity. Similarly, the tool connections can enable the robot 120 to control the cameras 315a, 615, scanners 315b, 715, lights 315c, 715, sweeper/mopper 810, sensors, actuators and other base tools 405 as needed during use.

In other embodiments, the robot 120 can simply provide power and/or communications between the management module 115 and the base tool 405. In some examples, the management module 115 can communicate directly with a transceiver on the base tool 405 to provide commands. In other embodiments, the management module 115 can communicate with the base tool 405 via a transceiver on the robot 120, with the communication transmitted from the robot 120 to the base tool 405 via one or more of the connections.

In still other embodiments, the base tools 405 and/or bins 130 can be self-contained and/or automated. In this manner, the robot 120 merely provides transportation for the base tool 405 or bin 130. In this configuration, the base tool 405 or bin 130 can be (1) powered by on-board power and controlled by the management module 115 or (2) powered by on-board power and act autonomously or semi-autonomously using on-board processors/logic. In still other examples, the lifting mechanism 235 can further comprise one or more weight or load sensors 925. The load sensors 925 can comprise, for examples, pressure transducers or strain gauges, and can provide information about the total weight of the load and/or the distribution of the load. The load sensors 925 can enable the robot 120 to sense when a load is unbalanced, for example, and either not fully pick up the load or pick the load up off center to prevent the load from toppling. In some embodiments, the load sensors 925 can also prevent the robot 120 from picking up a bin 130, for example, that exceeds its carrying capacity. This can reduce the risk of injury in the warehouse (e.g., due to falling loads) and reduce maintenance on the robots 120, among other things.

Figure 10:
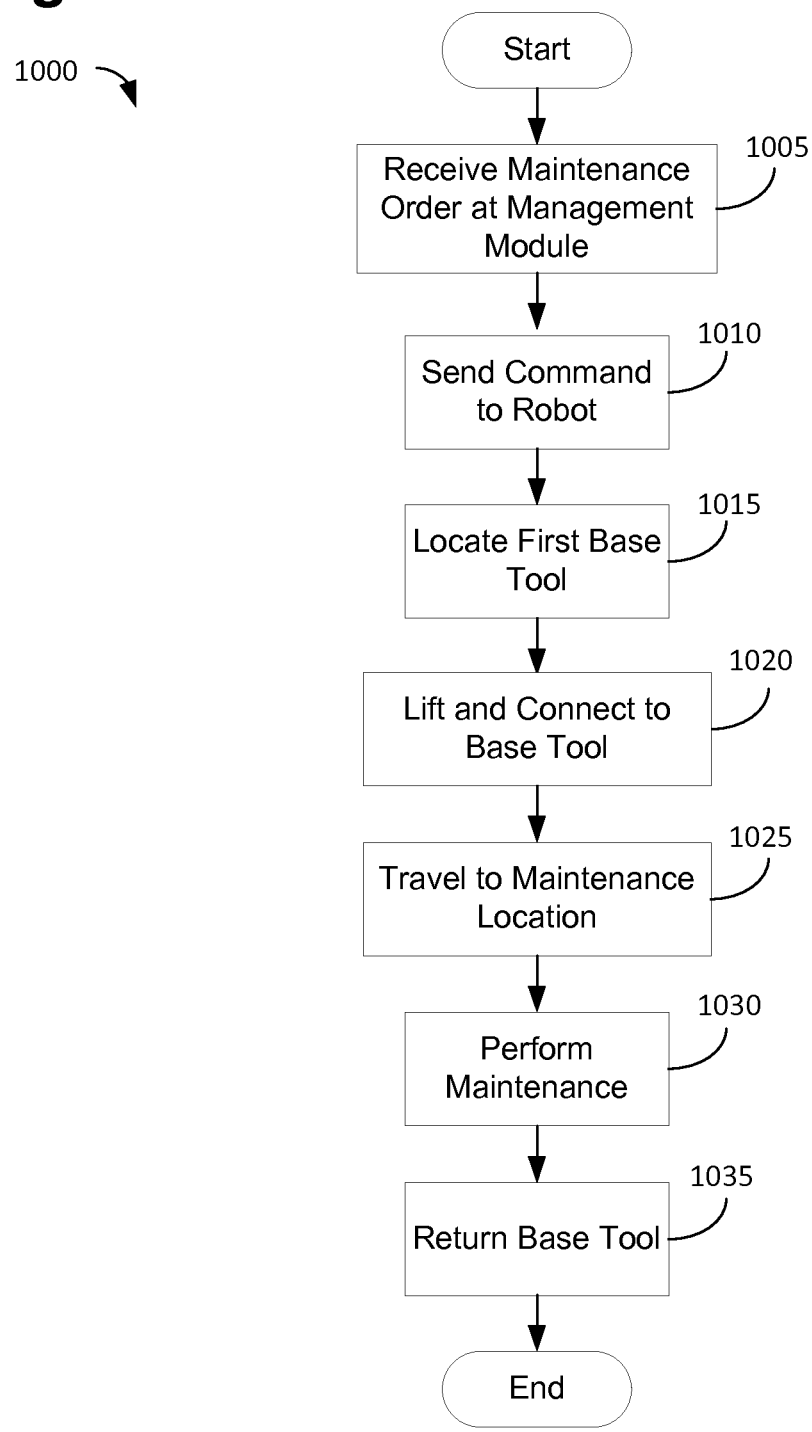
FIG. 10 is a flow diagram of a process for performing maintenance tasks in an automated warehouse, in accordance with some examples of the present disclosure.

As shown in FIG. 10, examples of the present disclosure can also comprise a method 1000 for performing various maintenance operations with a robot and a base tool (or bin). The method 1000 can begin with a robot receiving a maintenance order or request from the management module, as shown at 1005. The maintenance request can comprise a number of tasks including, but not limited to, scanning the warehouse for obstructions or misplaced merchandise, capturing images or scans for inventory control, cleaning or otherwise maintaining the warehouse, and providing light to other maintenance projects.

The management module can then send the command to a robot, as shown at 1010. In some examples, the command can be sent to the nearest robot to the base tool, the nearest robot to the management module, or simply a robot that is not currently occupied. The instruction can include, for example, the task to be completed, the base tool required for the task, the location of the base tool and the task, and the estimated time of completion. So, for example, the command can instruct the robot to scan the entire warehouse with the camera base tool, that the camera tool is in the northwest corner of the warehouse, and that it will take the robot approximately one hour to travel up and down every aisle imaging every bin.

Based on the command, a homing signal, track, visual identifier, location identifier, or other means, the robot can then locate the base tool required for the job, as shown at 1015. In some examples, each base tool can be returned to the same location or a different location after use and the location for each can be stored by the management module or the robot, for example. As mentioned above, the base tool can comprise, for example, a camera base tool, a light base tool, or a robotic arm base tool. In some examples, the system can also comprise a "Swiss army knife" base tool comprising two or more components on the same base (e.g., lights and cameras). In other examples, the command can instruct the robot to locate a bin that includes additional components. In this case, the bin is used not to have merchandise picked or stowed, but to utilize the equipment (e.g., cameras and/or lights) installed on the bin. Alternatively, the command can comprise both instructions with respect to inventory to be picked from or stowed to the bin, and also instructions with respect to other equipment or components installed on the bin, to be performed either serially or in parallel.

The robot can then lift and connect with the base tool, as shown at 1020. As mentioned above, the connection can comprise power and/or data communications connections. If the base tool is the robotic arm base tool, for example, the connection can include a power connection for the robot to power the arm and/or data communications connections for the robot (or the management module) to control the arm. This can enable the robot to move about the warehouse and remove obstructions from the floor of the warehouse, for example, or otherwise manipulate objects or items using the robotic arm.

Once connected, the robot can travel to the maintenance location, as shown at 1025. In some examples, location information can be provided in the message from the management module. In other examples, location information for certain tasks can be stored on the robot. If the task is to scan the entire warehouse for obstructions or clean the floor in the warehouse with the floor base tool, for example, the robot can follow a predetermined path up and down every aisle, or the robot can determine its path while performing the operations, with or without input/control by the management module.

The robot can then perform the requested maintenance item, as shown at 1030. As mentioned above, in some embodiments, the robot can be substantially autonomous and can control the base tool (e.g., the robot can control the robotic arm base tool directly), the pattern, and the overall procedure of the maintenance item. In other embodiments, the management module can control the robot as a tool, with the robot merely providing transportation, power, and/or a data communications link to the base tool. In still other embodiments, the management module can control certain portions of the maintenance item, while the robot can control other portions. When the task is complete, the robot can return the base tool to its normal location or any other location, for example, as shown at 1035, and then resume other activities.

Figure 11:
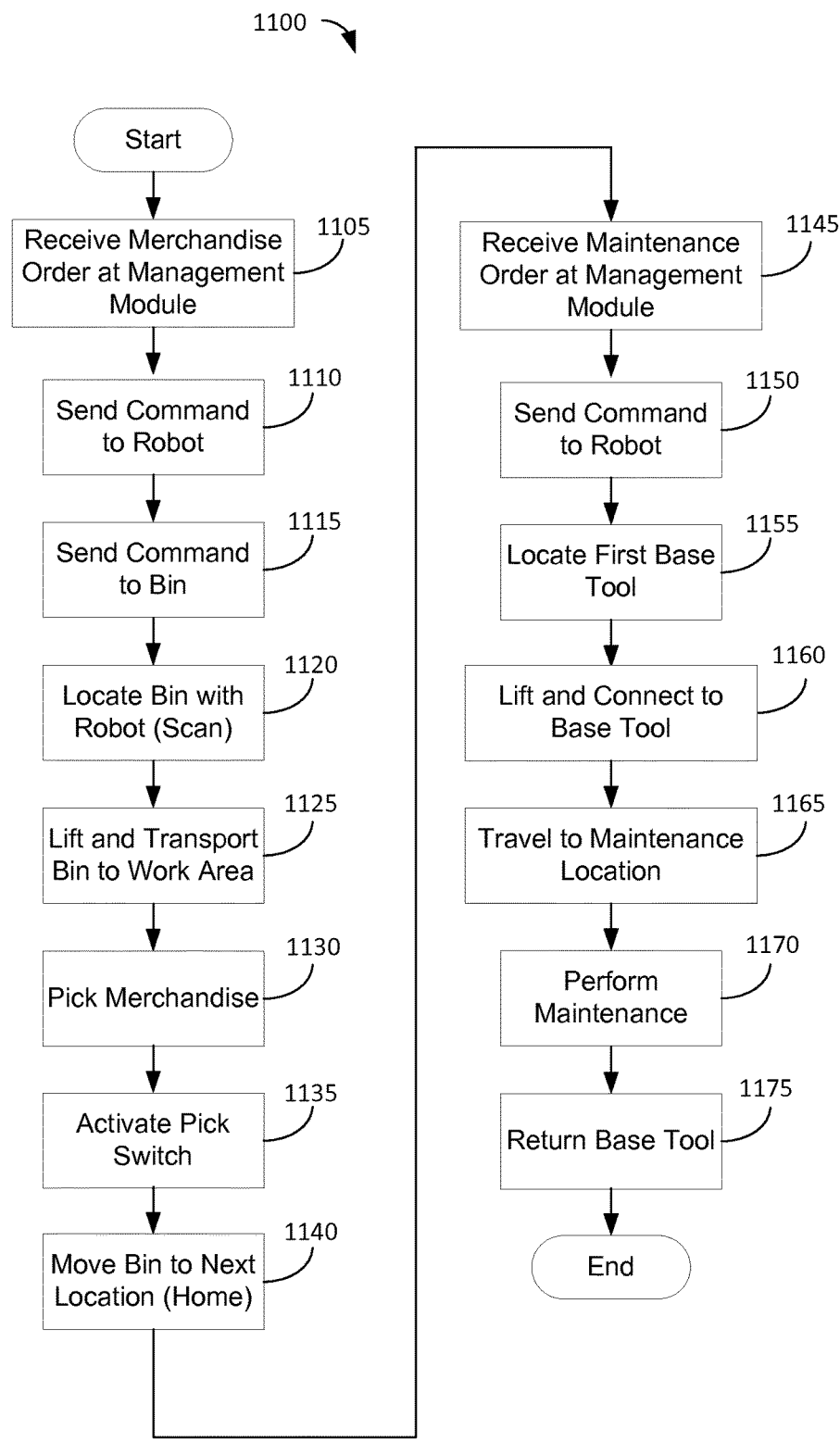
FIG. 11 is a flow diagram of a process for picking merchandise and performing maintenance tasks with the same robot in an automated warehouse, in accordance with some examples of the present disclosure.

As shown in FIG. 11, due to the modular nature of the system, embodiments of the present disclosure can also comprise a method 1100 of performing multiple tasks with the same robot. In other words, because the bins 130, base tools 405, and shelves 310 are modular in nature, no specialized robots 120 are required and a single type of robot can perform multiple tasks. The method 1100 can begin with the management module receiving a request for product, for example, as shown at 1105. In some examples, the management module can be connected to an e-commerce website, for example, and can receive requests directly. In other examples, orders can be handled by an exterior website, call center, or application, and then sent to the management module.

The management module can then send a message to a robot in the warehouse, as shown at 1110. The message can include the location of the bin containing requested merchandise, for example, the location of the work station where the merchandise will be picked, and details about the bin itself. If the bin contains additional electronics, for example, the message may also instruct the robot to utilize a camera or scanner on the bin once connected. The message may also instruct the robot to take the bin back to its original location, to another location, to maintenance, or to be restocked, for example, after the pick is completed.

In some examples, such as when the bin has a power source and additional electronic components, the management module can also send a message to the bin, as shown at 1115. In some examples, the message may instruct the bin to turn on its indicators. In other examples, the message may instruct the bin to activate a beacon to help the robot locate the bin. The bin may also include lights, cameras, scanners, sensors, actuators or other equipment that should be activated prior to the arrival of the robot. In still other examples, the bin may not have on-board power and the management module may send messages only after the bin is attached to the robot.

The robot can then locate the bin in the warehouse, as shown at 1120. As mentioned above, location information can be included in the message to the robot, or can be stored onboard the robot. The robot can use GPS, cellular location services, a homing beacon, visual identifiers, location identifiers, tracks and/or slots in the floor, or other suitable means to travel from its current location to the bin. In some examples, the robot can also scan the bin to ensure it has located the correct bin.

The robot can then lift the bin slightly off the floor, ensuring the bin is sufficiently balanced on the robot, and transport the bin to the appropriate work station for picking, as shown at 1125. In some examples, lifting the bin can also establish one or more electrical connections including, for example, power and/or data communications between the bin and the robot. This can enable the robot to transfer power to any onboard power source for the bin, or vice versa. The electrical connections can also enable the robot to utilize, transmit, and/or download data from any electrical equipment on the bin. In some examples, the electrical equipment on the bin can only be powered when the robot is connected to the bin. As mentioned above, this can enable the robot to scan or image the warehouse as it travels from the bin location to the work station and back, among other operations or tasks.

At the work station an employee, or "picker," can remove the requested merchandise from the bin, as shown at 1130. In some examples, the picker can then manually activate (or deactivate) the pick switch on the bin, as shown at 1135. In other examples, a laser scanner or camera, for example, can detect the pick and activate the pick switch on the bin. In some examples, the pick switch can turn off the indicators on the bin. In other examples, the pick switch can also send a message from the bin and/or the robot to the management module that the pick is complete. In still other examples, the pick switch can deactivate the electrical equipment on the bin. The robot can then return the bin to its original location, another location, maintenance, or restocking, as necessary, as shown at 1140.

As mentioned above, due to the modular nature of the system, the same robot 120 can then receive a request to perform a maintenance task from the management module, as shown at 1145. As before, the maintenance request can comprise a number of tasks including, but not limited to, scanning the warehouse for obstructions or misplaced merchandise, capturing images, pictures or scans for inventory control, sensing characteristics of the environment, and providing light to other maintenance projects.

The management module can then send the command to a robot, as shown at 1150. In some examples, the command can be sent to the robot nearest to the base tool, the robot nearest to the management module, or simply a robot that is not currently occupied. The instruction can include, for example, the task to be completed, the base tool required for the task, the location of the base tool and the task, and the estimated time of completion. So, for example, the command can instruct the robot to scan the entire warehouse with the camera base tool, that the camera tool is in the northwest corner of the warehouse, and that it will take the robot approximately one hour to travel up and down every aisle imaging every bin.

Based on the command, a homing signal, track, visual identifier, location identifier, or other means, the robot can then locate the base tool required for the job, as shown at 1155. In some examples, each base tool can be returned to the same location or another location after use and the location for each can be stored on the robot, for example. As mentioned above, the base tool can comprise, for example, a camera base tool, a light base tool, or a robotic arm base tool. In some examples, the system can also comprise a "Swiss army knife" base tool comprising two or more components on the same base (e.g., lights, sensors, actuators, and cameras). In other examples, the command can instruct the robot to locate a bin that includes additional components. In this case, the bin is used not to have merchandise picked, but to utilize the equipment (e.g., cameras, scanners, sensors, actuators and/or lights) installed on the bin.

The robot can then lift and connect with the base tool, as shown at 1160. As mentioned above, the connection can comprise power and/or data communications connections. If the base tool is the robotic arm base tool, for example, the connection can include a power connection for the robot to power the arm and/or data communications connections for the robot (or the management module) to control the arm. This can enable the robot to go into the warehouse and remove obstructions from the floor of the warehouse, for example.

Once connected, the robot can travel to the maintenance location, as shown at 1165. In some examples, location information can be provided in the message from the management module. In other examples, location information for certain tasks can be stored on the robot. If the task is to scan the entire warehouse for obstructions or clean the floor in the warehouse with the floor base tool, for example, the robot can follow a predetermined path up and down every aisle.

The robot can then perform the requested maintenance item, as shown at 1170. As mentioned above, in some embodiments, the robot can be substantially autonomous and can control the base tool (e.g., the robot can control the robotic arm base tool directly), the pattern, and the overall procedure of the maintenance item. In other embodiments, the management module can control the robot as a tool, with the robot merely providing transportation, power, and/or a data communications link to the base tool. In still other embodiments, the management module can control certain portions of the maintenance item, while the robot can control other portions. Once completed, the robot can return the base tool to its storage location or another location (or to maintenance for upkeep), as shown at 1175, and then move on to the next task (e.g., another pick or another maintenance task).

The management module can command the robot to "illuminate aisle four," for example, to provide illumination for maintenance workers. The robot can then retrieve the light base tool, either from a fixed location or by locating it visually or using a homing beacon, for example, and then travel to aisle four, which may be a location stored in the robot's memory and activate the light base tool. Once completed, the robot can then return the light base tool (or other base tool 405 or bin 130) to its original, or other appropriate, location. In some examples, the base tool 405 or bin 130 can have a fixed "home" location. In other examples, the management module can send a second command for the robot to return the base tool to a particular location. In addition, because of the modularity of the system, any robot can use any base tool, and a single robot can use one base tool, return or disconnect it, and then use another base tool.

In still other examples, the management module 115 can control the robot 120 and the base tool 405 directly. In other words, in some embodiments, the robot 120 can receive step-by-step instructions from the management module 115 to go to a first location, pick up a base tool 405, and then travel to a second location. The management module 115 can then send commands to the base tool 405 (either directly or via the robot 120) to perform one or more operations. The management module 115 can then send step-by-step instructions to the robot 120 to return to the first location and return (e.g., put down) the base tool 405. Of course, other load or control sharing combinations between the robots 120 and the management module 115 could be used without departing from the spirit of the invention.

While several possible examples are disclosed above, examples of the present disclosure are not so limited. For instance, while a system of modular tools for warehouse robots is disclosed, other tools and other robots could be selected without departing from the spirit of the disclosure. In addition, the location and configuration used for various features of examples of the present disclosure such as, for example, the location and configuration of bins, the types of robots, and the layout of the warehouse can be varied according to a particular warehouse, inventory, or robot that requires a slight variation due to, for example, size or construction covenants, the type of robot required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
    a management module to direct one or more components of the system;
    a robot comprising:
        a drive system to move the robot within a warehouse;
        one or more sensors to provide data to at least the robot or the management module;
        a lifting mechanism, with a retracted position and an extended position, to lift the one or more components of the system off of a floor of the warehouse, the lifting mechanism being in the extended position to move, via the drive system, the one or more components of the system within the warehouse; and
        one or more connections to transfer power and provide communications between the robot and the one or more components of the system;
    a robotic arm base tool comprising:
        a base comprising one or more complementary connections to transfer power and provide communications between the robotic arm base tool and the robot; and
        a robotic arm coupled to the base and connected to at least one of the one or more complementary connections,
    wherein the one or more connections and the one or more complementary connections are connected between the robot and the robotic arm base tool with the lifting mechanism in the extended position;
    wherein the one or more connections and the one or more complementary connections are disconnected between the robot and the robotic arm base tool with the lifting mechanism in the retracted position; and
    wherein the robot is configured to perform a first operation when uncoupled from the robotic arm base tool and perform a second, different operation with the robotic arm when coupled to the robotic arm base tool.

2. The system of claim 1, wherein the robot further comprises a first portion of a ball grid array to provide the one or more connections; and
    wherein the robotic arm base tool further comprises a second portion of the ball grid array to provide the one or more complementary connections.

3. The system of claim 1, the robot further comprising a wireless transceiver to communicate with the management module;
    wherein the management module controls the robotic arm via the one or more connections and the one or more complementary connections.

4. The system of claim 1, the robot further comprising a wireless transceiver to communicate with the management module;
    wherein the management module sends one or more commands to the robot via the wireless transceiver; and
    wherein the robot controls the robotic arm via the one or more connections and the one or more complementary connections.

5. A system comprising:
    a robot comprising:
        a drive system to move the robot within an environment;
        a lifting mechanism, with a retracted position and an extended position, to connect to one or more components of the system within the environment; and
        one or more connections to transfer power or provide communications between the robot and the one or more components of the system; and
    a base tool comprising:
        a base comprising one or more complementary connections to transfer power or provide communications between the base tool and the robot; and
        a tool disposed on the base and coupled to at least one of the one or more complementary connections;

wherein the one or more connections and the one or more complementary connections are connected between the robot and the base tool in the extended position; and wherein the one or more connections and the one or more complementary connections are disconnected between the robot and the base tool in the retracted position.

6. The system of claim 5, wherein the base tool is a first base tool, the base is a first base, and the tool is a first tool, and further comprising:
a second, different base tool comprising:
a second base comprising one or more second complementary connections to transfer power or provide communications between the second base tool and the robot; and
a second, different tool disposed on the second base and coupled to at least one of the one or more second complementary connections;
wherein the robot connects to the first base tool to perform a first operation; and
wherein the robot connects with the second base tool to perform a second, different operation.

7. The system of claim 5, wherein the base tool includes a robotic arm base tool comprising a robotic arm configured to at least one of grasp, move, manipulate, or lift objects.

8. The system of claim 5, wherein the base tool comprises a camera base tool including one or more cameras configured to capture one or more images of the environment.

9. The system of claim 5, wherein the base tool comprises a light base tool including one or more light sources configured to illuminate an area proximate the robot.

10. The system of claim 5, wherein the base tool comprises one or more floor tools configured to maintain at least a portion of a floor of the environment.

11. A system comprising:
a robot comprising:
a drive system to move the robot within an environment;
a lifting mechanism, with a retracted position and an extended position, to selectively connect to one or more components of the system within the environment; and
one or more connections to transfer power or data between the robot and the one or more components of the system;
a first base tool, comprising a first base and a first tool and one or more first complementary connections to transfer power or data between the first base tool and the robot; and
a second, different base tool, comprising a shelving unit and one or more second complementary connections to transfer power or data between the second base tool and the robot, the second base tool comprising:
one or more shelves, each shelf comprising an inner portion and an outer portion, to store inventory items; and
one or more electronic components connected to the one or more second complementary connections;
wherein the one or more connections and the one or more first complementary connections or the one or more second complementary connections are connected between the robot and the first base tool or the second base tool, respectively, in the extended position;
wherein the one or more connections and the one or more first complementary connections or the one or more second complementary connections are disconnected between the robot and the first base tool or the second base tool, respectively, in the retracted position;
wherein the robot connects to the first base tool to perform a first operation using the first base tool; and
wherein the robot connects to the second base tool to perform a second, different operation using the second base tool.

12. The system of claim 11, wherein the shelving unit further comprises one or more actuators for moving a first shelf of the one or more shelves between a first position and a second position;
wherein, in the first position, the first shelf is tilted such that the inner portion of the first shelf is below the outer portion of the first shelf to cause the inventory items on the first shelf to move to a central location on the shelving unit; and
wherein, in the second position, the first shelf is tilted such that the inner portion of the first shelf is above the outer portion of the first shelf to cause the inventory items on the first shelf to move to an outer location on the shelving unit.

13. The system of claim 11, wherein a first shelf of the one or more shelves further comprises a pusher for moving inventory items between the inner portion of the first shelf and the outer portion of the first shelf.

14. The system of claim 11, wherein at least one of the first base tool or the second base tool comprises at least two of: a light source, an imaging device, a sensor, an actuator, a floor maintenance device, a power source or a robotic arm.

15. The system of claim 11, wherein the lifting mechanism further comprises one or more sensors configured to detect at least one of a load imbalance or an overload on the lifting mechanism.

16. The system of claim 11, the second base tool further comprising:
one or more lights to indicate the shelving unit has a pick pending; and
a pick switch configured to turn off the one or more lights.

17. The system of claim 16, wherein the pick switch further initiates a signal to a management module indicating completion of the pick.

18. The system of claim 16, wherein the pick switch comprises a laser scanner to detect removal of one or more inventory items from the shelving unit; and
wherein the laser scanner further initiates a signal to a management module indicating completion of the pick.

19. The system of claim 16, wherein the pick switch comprises a radio frequency identification (RFID) scanner to detect removal of one or more inventory items from the shelving unit; and
wherein the RFID scanner further initiates a signal to a management module indicating completion of the pick.

* * * * *